US 9,464,903 B2

(12) United States Patent
Sidhu et al.

(10) Patent No.: US 9,464,903 B2
(45) Date of Patent: Oct. 11, 2016

(54) CROWD SOURCING BASED ON DEAD RECKONING

(75) Inventors: Gursharan S. Sidhu, Seattle, WA (US); Sharad Agarwal, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 853 days.

(21) Appl. No.: 13/183,124

(22) Filed: Jul. 14, 2011

(65) Prior Publication Data

US 2013/0018629 A1 Jan. 17, 2013

(51) Int. Cl.
| | |
|---|---|
| *G06F 15/00* | (2006.01) |
| *G01C 21/16* | (2006.01) |
| *G01C 21/12* | (2006.01) |
| *G01C 21/14* | (2006.01) |
| *G01C 21/20* | (2006.01) |
| *G01S 5/00* | (2006.01) |
| *G01S 19/49* | (2010.01) |
| *G01C 21/28* | (2006.01) |
| *H04W 4/02* | (2009.01) |
| *G01S 19/48* | (2010.01) |
| *G01S 5/14* | (2006.01) |

(52) U.S. Cl.
CPC .......... *G01C 21/165* (2013.01); *G01C 21/12* (2013.01); *G01C 21/14* (2013.01); *G01C 21/16* (2013.01); *G01C 21/206* (2013.01); *G01C 21/28* (2013.01); *G01S 5/0027* (2013.01); *G01S 5/14* (2013.01); *G01S 19/48* (2013.01); *G01S 19/49* (2013.01); *H04W 4/027* (2013.01)

(58) Field of Classification Search
CPC .... G01C 21/165; G01C 21/10; G01C 21/12; G01C 21/14; G01C 21/16; G01C 21/28; G01C 21/206; G01S 19/48; G01S 19/49; G01S 5/0027; H04W 4/027
See application file for complete search history.

(56) References Cited

U.S. PATENT DOCUMENTS 4,357,593 A * 11/1982 von Tomkewitsch ........ 340/988
4,796,191 A *  1/1989 Honey et al. ................. 701/445
(Continued)

FOREIGN PATENT DOCUMENTS

| CN | 1375999 A | 10/2002 |
|---|---|---|
| CN | 1488955 A | 4/2004 |

(Continued)

OTHER PUBLICATIONS

"MEMS based motion sensing design", Retrieved at <<http://www.eeherald.com/section/design-guide/mems_application.html>>, Retrieved Date: Mar. 30, 2011, pp. 2.

(Continued)

*Primary Examiner* — Mohamed Charioui
*Assistant Examiner* — John Kuan
(74) *Attorney, Agent, or Firm* — Judy Yee; Micky Minhas

(57) ABSTRACT

An identification is made as to when a device is at an anchor location, which can be a proximity zone along an edge of a dead zone or a location where a signal from a beacon is detected. In response to the device being at an anchor location, recording of crowd sourcing data based on dead reckoning starts. Recording crowd sourcing data based on dead reckoning includes identifying one or more signals received by a device while the device is at each of multiple positions. For each of the multiple positions, both an indication of the position determined based at least in part on dead reckoning and an indication of the one or more signals received while the device is at that position are recorded.

24 Claims, 9 Drawing Sheets

(56) References Cited

U.S. PATENT DOCUMENTS

| | | | |
|---|---|---|---|
| 4,949,268 A | 8/1990 | Nishikawa et al. |
| 5,394,333 A | 2/1995 | Kao |
| 5,493,692 A | 2/1996 | Theimer et al. |
| 5,544,321 A | 8/1996 | Theimer et al. |
| 5,555,376 A | 9/1996 | Theimer et al. |
| 5,564,079 A | 10/1996 | Olsson |
| 5,592,173 A | 1/1997 | Lau et al. |
| 5,603,054 A | 2/1997 | Theimer et al. |
| 5,611,050 A | 3/1997 | Theimer et al. |
| 5,623,194 A | 4/1997 | Boll et al. |
| 5,629,855 A | 5/1997 | Kyrtsos et al. |
| 5,812,865 A | 9/1998 | Theimer et al. |
| 5,842,130 A | 11/1998 | Oprescu-Surcobe |
| 5,845,227 A | 12/1998 | Peterson |
| 5,883,598 A | 3/1999 | Parl et al. |
| 5,943,621 A | 8/1999 | Ho et al. |
| 5,948,040 A | 9/1999 | DeLorme et al. |
| 5,978,732 A | 11/1999 | Kakitani et al. |
| 6,052,598 A | 4/2000 | Rudrapatna et al. |
| 6,116,363 A | 9/2000 | Frank |
| 6,122,572 A | 9/2000 | Yavnai |
| 6,175,805 B1 | 1/2001 | Abe |
| 6,292,687 B1 | 9/2001 | Lowell et al. |
| 6,313,786 B1 | 11/2001 | Sheynblat et al. |
| 6,314,347 B1 | 11/2001 | Kuroda et al. |
| 6,353,398 B1 | 3/2002 | Amin et al. |
| 6,381,522 B1 | 4/2002 | Watanabe et al. |
| 6,418,424 B1 | 7/2002 | Hoffberg et al. |
| 6,466,232 B1 | 10/2002 | Newell et al. |
| 6,480,783 B1 | 11/2002 | Myr |
| 6,490,519 B1 | 12/2002 | Lapidot et al. |
| 6,513,046 B1 | 1/2003 | Abbott, III et al. |
| 6,549,915 B2 | 4/2003 | Abbott, III et al. |
| 6,556,832 B1 | 4/2003 | Soliman |
| 6,564,149 B2 | 5/2003 | Lai |
| 6,574,351 B1 | 6/2003 | Miyano |
| 6,577,946 B2 | 6/2003 | Myr |
| 6,615,130 B2 | 9/2003 | Myr |
| 6,668,227 B2 | 12/2003 | Hamada et al. |
| 6,672,506 B2 | 1/2004 | Swartz et al. |
| 6,678,525 B1 | 1/2004 | Baranger et al. |
| 6,721,572 B1 | 4/2004 | Smith et al. |
| 6,741,188 B1 | 5/2004 | Miller et al. |
| 6,747,675 B1 | 6/2004 | Abbott et al. |
| D494,584 S | 8/2004 | Schlieffers et al. |
| 6,791,580 B1 | 9/2004 | Abbott et al. |
| 6,796,505 B2 | 9/2004 | Pellaumail et al. |
| 6,799,047 B1 | 9/2004 | Bahl et al. |
| 6,801,223 B1 | 10/2004 | Abbott et al. |
| 6,807,483 B1 | 10/2004 | Chao et al. |
| 6,810,325 B2 | 10/2004 | Amano et al. |
| 6,812,937 B1 | 11/2004 | Abbott et al. |
| 6,837,436 B2 | 1/2005 | Swartz et al. |
| 6,842,877 B2 | 1/2005 | Robarts et al. |
| RE38,724 E | 4/2005 | Peterson |
| 6,889,382 B1 | 5/2005 | Anderson |
| 6,925,378 B2 | 8/2005 | Tzamaloukas |
| 6,992,625 B1 | 1/2006 | Krumm et al. |
| 7,010,501 B1 | 3/2006 | Roslak et al. |
| 7,040,541 B2 | 5/2006 | Swartz et al. |
| 7,054,938 B2 | 5/2006 | Sundqvist et al. |
| 7,058,506 B2 | 6/2006 | Kawase et al. |
| 7,063,263 B2 | 6/2006 | Swartz et al. |
| 7,084,762 B2 | 8/2006 | Pedrazzini et al. |
| 7,096,030 B2 | 8/2006 | Huomo |
| 7,116,987 B2 | 10/2006 | Spain, Jr. et al. |
| 7,116,988 B2 | 10/2006 | Dietrich et al. |
| 7,127,213 B2 | 10/2006 | Haymes et al. |
| 7,130,743 B2 | 10/2006 | Kudo et al. |
| 7,161,914 B2 | 1/2007 | Shoaib et al. |
| 7,162,367 B2 | 1/2007 | Lin et al. |
| 7,171,378 B2 | 1/2007 | Petrovich et al. |
| 7,195,157 B2 | 3/2007 | Swartz et al. |
| 7,200,394 B2 | 4/2007 | Aoki et al. |
| 7,215,969 B2 | 5/2007 | Benco et al. |
| 7,233,861 B2 | 6/2007 | Van Buer et al. |
| 7,250,907 B2 | 7/2007 | Krumm et al. |
| 7,299,059 B2 | 11/2007 | Misikangas et al. |
| 7,321,774 B1 | 1/2008 | Lau et al. |
| 7,349,683 B2 | 3/2008 | Misikangas et al. |
| 7,359,713 B1 | 4/2008 | Tiwari |
| 7,385,501 B2 | 6/2008 | Miller et al. |
| 7,433,696 B2 | 10/2008 | Dietrich et al. |
| 7,463,890 B2 | 12/2008 | Herz et al. |
| 7,512,462 B2 | 3/2009 | Nichols et al. |
| 7,590,589 B2 | 9/2009 | Hoffberg |
| 7,617,042 B2 | 11/2009 | Horvitz et al. |
| 7,630,986 B1 | 12/2009 | Herz et al. |
| 7,636,707 B2 | 12/2009 | Chaudhuri et al. |
| 7,698,055 B2 | 4/2010 | Horvitz et al. |
| 7,705,728 B2 | 4/2010 | Mock et al. |
| 7,706,964 B2 | 4/2010 | Horvitz et al. |
| 7,739,040 B2 | 6/2010 | Horvitz |
| 7,778,440 B2 | 8/2010 | Malone |
| 7,796,944 B2 | 9/2010 | Eaton et al. |
| 7,796,966 B2 | 9/2010 | Bhattacharya et al. |
| 7,813,870 B2 | 10/2010 | Downs et al. |
| 7,835,863 B2 | 11/2010 | Lokshin |
| 7,840,340 B2 | 11/2010 | Graham et al. |
| 7,856,234 B2 | 12/2010 | Alizadeh-Shabdiz et al. |
| 7,864,048 B1 | 1/2011 | Cope et al. |
| 7,873,368 B2 | 1/2011 | Goren |
| 7,899,611 B2 | 3/2011 | Downs et al. |
| 7,912,628 B2 | 3/2011 | Chapman et al. |
| 7,925,426 B2 | 4/2011 | Koebler et al. |
| 7,961,651 B2 | 6/2011 | Kim et al. |
| 7,991,718 B2 | 8/2011 | Horvitz et al. |
| 8,024,112 B2 | 9/2011 | Krumm et al. |
| 8,090,530 B2 | 1/2012 | Horvitz |
| 8,126,641 B2 | 2/2012 | Horvitz |
| 8,155,872 B2 | 4/2012 | Kjeldsen et al. |
| 8,165,773 B1 | 4/2012 | Chavez et al. |
| 8,174,447 B2 | 5/2012 | Loidl et al. |
| 8,180,366 B2 | 5/2012 | Ernst et al. |
| 8,190,362 B2 | 5/2012 | Barker et al. |
| 8,244,272 B2 | 8/2012 | Morgan et al. |
| 8,255,275 B2 | 8/2012 | Collopy et al. |
| 8,260,481 B2 | 9/2012 | Naik et al. |
| 8,311,730 B2 | 11/2012 | Neff |
| 8,320,939 B1 * | 11/2012 | Vincent .................. 455/456.1 |
| 8,433,512 B1 | 4/2013 | Lopatenko et al. |
| 8,443,662 B2 | 5/2013 | Lane et al. |
| 8,463,545 B2 | 6/2013 | Boore et al. |
| 8,484,113 B2 | 7/2013 | Collopy et al. |
| 8,519,860 B2 | 8/2013 | Johnson et al. |
| 8,532,670 B2 | 9/2013 | Kim et al. |
| 8,538,686 B2 | 9/2013 | Gruen et al. |
| 8,560,218 B1 | 10/2013 | Kahn et al. |
| 8,565,783 B2 | 10/2013 | Yang et al. |
| 8,566,029 B1 | 10/2013 | Lopatenko et al. |
| 8,589,065 B2 | 11/2013 | Scofield et al. |
| 8,620,692 B2 | 12/2013 | Collopy et al. |
| 8,712,931 B1 | 4/2014 | Wahlen |
| 8,751,146 B2 | 6/2014 | Shrivathsan et al. |
| 8,762,053 B1 | 6/2014 | Lehman |
| 8,788,606 B2 | 7/2014 | Johnson et al. |
| 8,825,381 B2 | 9/2014 | Tang |
| 8,898,002 B2 | 11/2014 | Barrett |
| 8,981,995 B2 | 3/2015 | Schlesinger et al. |
| 8,990,333 B2 | 3/2015 | Johnson et al. |
| 9,134,137 B2 | 9/2015 | Brush et al. |
| 2001/0029425 A1 | 10/2001 | Myr |
| 2001/0030664 A1 | 10/2001 | Shulman et al. |
| 2001/0040590 A1 | 11/2001 | Abbott et al. |
| 2001/0040591 A1 | 11/2001 | Abbott et al. |
| 2001/0043231 A1 | 11/2001 | Abbott et al. |
| 2001/0043232 A1 | 11/2001 | Abbott et al. |
| 2002/0032689 A1 | 3/2002 | Abbott, III et al. |
| 2002/0044152 A1 | 4/2002 | Abbott, III et al. |
| 2002/0050944 A1 | 5/2002 | Sheynblat et al. |
| 2002/0052930 A1 | 5/2002 | Abbott et al. |
| 2002/0052963 A1 | 5/2002 | Abbott et al. |
| 2002/0054130 A1 | 5/2002 | Abbott, III et al. |
| 2002/0054174 A1 | 5/2002 | Abbott et al. |

(56) References Cited

U.S. PATENT DOCUMENTS

| | | |
|---|---|---|
| 2002/0078204 A1 | 6/2002 | Newell et al. |
| 2002/0080155 A1 | 6/2002 | Abbott et al. |
| 2002/0080156 A1 | 6/2002 | Abbott et al. |
| 2002/0083025 A1 | 6/2002 | Robarts et al. |
| 2002/0083158 A1 | 6/2002 | Abbott et al. |
| 2002/0087525 A1 | 7/2002 | Abbott et al. |
| 2002/0099817 A1 | 7/2002 | Abbott et al. |
| 2002/0107618 A1 | 8/2002 | Deguchi et al. |
| 2003/0036842 A1 | 2/2003 | Hancock |
| 2003/0042051 A1 | 3/2003 | Kriger |
| 2003/0046401 A1 | 3/2003 | Abbott et al. |
| 2003/0069683 A1 | 4/2003 | Lapidot et al. |
| 2003/0135304 A1 | 7/2003 | Sroub et al. |
| 2003/0139863 A1 | 7/2003 | Toda et al. |
| 2003/0140088 A1 | 7/2003 | Robinson et al. |
| 2003/0153338 A1 | 8/2003 | Herz et al. |
| 2003/0154009 A1 | 8/2003 | Basir et al. |
| 2003/0154476 A1 | 8/2003 | Abbott, III et al. |
| 2003/0195700 A1 | 10/2003 | Hamada et al. |
| 2003/0229471 A1 | 12/2003 | Guralnik et al. |
| 2003/0229895 A1 | 12/2003 | Jasinschi et al. |
| 2004/0019603 A1 | 1/2004 | Haigh et al. |
| 2004/0068364 A1 | 4/2004 | Zhao et al. |
| 2004/0090121 A1 | 5/2004 | Simonds et al. |
| 2004/0090346 A1 | 5/2004 | Simonds et al. |
| 2004/0092253 A1 | 5/2004 | Simonds et al. |
| 2004/0093154 A1 | 5/2004 | Simonds et al. |
| 2004/0093155 A1 | 5/2004 | Simonds et al. |
| 2004/0128066 A1 | 7/2004 | Kudo et al. |
| 2004/0153445 A1 | 8/2004 | Horvitz |
| 2004/0176211 A1 | 9/2004 | Kitajima et al. |
| 2004/0189475 A1 | 9/2004 | Cooper et al. |
| 2004/0201500 A1 | 10/2004 | Miller et al. |
| 2004/0230374 A1 | 11/2004 | Tzamaloukas |
| 2004/0260457 A1 | 12/2004 | Kawase et al. |
| 2004/0266457 A1 | 12/2004 | Dupray |
| 2004/0268403 A1 | 12/2004 | Krieger |
| 2005/0021417 A1 | 1/2005 | Kassan |
| 2005/0034078 A1 | 2/2005 | Abbott et al. |
| 2005/0037775 A1 | 2/2005 | Moeglein et al. |
| 2005/0046584 A1 | 3/2005 | Breed |
| 2005/0048946 A1 | 3/2005 | Holland |
| 2005/0049900 A1 | 3/2005 | Hirose et al. |
| 2005/0062643 A1 | 3/2005 | Pande et al. |
| 2005/0125148 A1 | 6/2005 | Van Buer et al. |
| 2005/0131607 A1 | 6/2005 | Breed |
| 2005/0144318 A1 | 6/2005 | Chang |
| 2005/0149253 A1 | 7/2005 | Nambata |
| 2005/0219120 A1 | 10/2005 | Chang |
| 2005/0228553 A1 | 10/2005 | Tryon |
| 2005/0261004 A1 | 11/2005 | Dietrich et al. |
| 2005/0266858 A1 | 12/2005 | Miller et al. |
| 2005/0272442 A1 | 12/2005 | Miller et al. |
| 2005/0283503 A1 | 12/2005 | Hancock et al. |
| 2006/0019676 A1 | 1/2006 | Miller et al. |
| 2006/0022048 A1 | 2/2006 | Johnson |
| 2006/0052115 A1 | 3/2006 | Khushu |
| 2006/0167784 A1 | 7/2006 | Hoffberg |
| 2006/0241862 A1 | 10/2006 | Ichihara et al. |
| 2006/0256005 A1 | 11/2006 | Thandu et al. |
| 2006/0264211 A1 | 11/2006 | Kalhan |
| 2006/0284765 A1 | 12/2006 | Bernhardt et al. |
| 2006/0286988 A1 | 12/2006 | Blume |
| 2006/0287813 A1 | 12/2006 | Quigley |
| 2007/0008927 A1 | 1/2007 | Herz et al. |
| 2007/0073477 A1 | 3/2007 | Krumm et al. |
| 2007/0091037 A1 | 4/2007 | Lee |
| 2007/0106465 A1 | 5/2007 | Adam et al. |
| 2007/0115174 A1* | 5/2007 | Herrick .......................... 342/420 |
| 2007/0179792 A1 | 8/2007 | Kramer |
| 2007/0208495 A1 | 9/2007 | Chapman et al. |
| 2007/0225937 A1 | 9/2007 | Spiesberger |
| 2007/0287473 A1 | 12/2007 | Dupray |
| 2008/0005172 A1 | 1/2008 | Gutmann |
| 2008/0018529 A1 | 1/2008 | Yoshioka |
| 2008/0077326 A1 | 3/2008 | Funk et al. |
| 2008/0090591 A1 | 4/2008 | Miller et al. |
| 2008/0091537 A1 | 4/2008 | Miller et al. |
| 2008/0129598 A1 | 6/2008 | Godefroy et al. |
| 2008/0161018 A1 | 7/2008 | Miller et al. |
| 2008/0180637 A1 | 7/2008 | Kjeldsen et al. |
| 2008/0191941 A1 | 8/2008 | Saban et al. |
| 2008/0234935 A1 | 9/2008 | Wolf et al. |
| 2008/0248815 A1 | 10/2008 | Busch |
| 2008/0249667 A1 | 10/2008 | Horvitz et al. |
| 2008/0262728 A1 | 10/2008 | Lokshin et al. |
| 2008/0305808 A1 | 12/2008 | Chan et al. |
| 2008/0319658 A1 | 12/2008 | Horvitz et al. |
| 2008/0319660 A1 | 12/2008 | Horvitz et al. |
| 2009/0005061 A1 | 1/2009 | Ward et al. |
| 2009/0005975 A1 | 1/2009 | Forstall et al. |
| 2009/0009397 A1 | 1/2009 | Taylor |
| 2009/0043504 A1 | 2/2009 | Bandyopadhyay et al. |
| 2009/0051566 A1 | 2/2009 | Olsen et al. |
| 2009/0063038 A1 | 3/2009 | Shrivathsan et al. |
| 2009/0149155 A1 | 6/2009 | Grossman |
| 2009/0184849 A1* | 7/2009 | Nasiri et al. .................... 341/20 |
| 2009/0191892 A1 | 7/2009 | Kelley |
| 2009/0192709 A1 | 7/2009 | Yonker |
| 2009/0201896 A1 | 8/2009 | Davis et al. |
| 2009/0248301 A1 | 10/2009 | Judd et al. |
| 2009/0312032 A1 | 12/2009 | Bornstein |
| 2010/0010733 A1 | 1/2010 | Krumm et al. |
| 2010/0039929 A1 | 2/2010 | Cho |
| 2010/0079332 A1 | 4/2010 | Garen |
| 2010/0079334 A1 | 4/2010 | Roh et al. |
| 2010/0087230 A1 | 4/2010 | Peh et al. |
| 2010/0097269 A1 | 4/2010 | Loidl et al. |
| 2010/0106603 A1 | 4/2010 | Dey et al. |
| 2010/0127926 A1 | 5/2010 | Wang |
| 2010/0131308 A1 | 5/2010 | Collopy et al. |
| 2010/0153007 A1 | 6/2010 | Crowley |
| 2010/0156708 A1 | 6/2010 | Chen |
| 2010/0161179 A1 | 6/2010 | McClure et al. |
| 2010/0176992 A1 | 7/2010 | T'siobbel |
| 2010/0185388 A1 | 7/2010 | Horvitz |
| 2010/0250133 A1 | 9/2010 | Buros |
| 2010/0250727 A1 | 9/2010 | King et al. |
| 2010/0255856 A1 | 10/2010 | Kansal et al. |
| 2010/0255858 A1 | 10/2010 | Juhasz |
| 2010/0310071 A1 | 12/2010 | Malone et al. |
| 2010/0324813 A1 | 12/2010 | Sundararajan et al. |
| 2010/0332125 A1* | 12/2010 | Tan et al. ....................... 701/207 |
| 2011/0035142 A1 | 2/2011 | Tang |
| 2011/0039573 A1 | 2/2011 | Hardie |
| 2011/0050493 A1 | 3/2011 | Torimoto et al. |
| 2011/0071759 A1 | 3/2011 | Pande et al. |
| 2011/0148623 A1 | 6/2011 | Bishop et al. |
| 2011/0151898 A1 | 6/2011 | Chandra et al. |
| 2011/0163914 A1 | 7/2011 | Seymour |
| 2011/0169632 A1 | 7/2011 | Walker et al. |
| 2011/0178708 A1 | 7/2011 | Zhang et al. |
| 2011/0182238 A1 | 7/2011 | Marshall et al. |
| 2011/0184644 A1 | 7/2011 | McBurney |
| 2011/0191024 A1 | 8/2011 | DeLuca |
| 2011/0191052 A1 | 8/2011 | Lin et al. |
| 2011/0197200 A1 | 8/2011 | Huang et al. |
| 2011/0207471 A1 | 8/2011 | Murray et al. |
| 2011/0208430 A1 | 8/2011 | Tun et al. |
| 2011/0212732 A1 | 9/2011 | Garrett et al. |
| 2011/0238289 A1 | 9/2011 | Lehmann et al. |
| 2011/0238308 A1 | 9/2011 | Miller et al. |
| 2011/0246059 A1 | 10/2011 | Tokashiki |
| 2011/0270940 A1 | 11/2011 | Johnson |
| 2011/0282571 A1 | 11/2011 | Krumm et al. |
| 2011/0291886 A1 | 12/2011 | Krieter |
| 2011/0306323 A1 | 12/2011 | Do et al. |
| 2012/0052873 A1 | 3/2012 | Wong |
| 2012/0089322 A1 | 4/2012 | Horvitz |
| 2012/0121161 A1 | 5/2012 | Eade et al. |
| 2012/0129546 A1 | 5/2012 | Yang et al. |
| 2012/0173139 A1 | 7/2012 | Judd et al. |
| 2012/0176491 A1 | 7/2012 | Garin et al. |
| 2012/0188124 A1 | 7/2012 | Reidevall et al. |

(56) References Cited

U.S. PATENT DOCUMENTS

| | | |
|---|---|---|
| 2012/0209507 A1 | 8/2012 | Serbanescu |
| 2012/0218142 A1 | 8/2012 | Leclercq |
| 2012/0221244 A1 | 8/2012 | Georgy et al. |
| 2012/0238293 A9 | 9/2012 | Pan |
| 2012/0259541 A1 | 10/2012 | Downey et al. |
| 2012/0259666 A1 | 10/2012 | Collopy et al. |
| 2012/0290615 A1 | 11/2012 | Lamb et al. |
| 2012/0299724 A1 | 11/2012 | Kuper et al. |
| 2013/0002857 A1 | 1/2013 | Kulik et al. |
| 2013/0018581 A1 | 1/2013 | Sidhu et al. |
| 2013/0030690 A1 | 1/2013 | Witmer |
| 2013/0035111 A1 | 2/2013 | Moeglein et al. |
| 2013/0095848 A1 | 4/2013 | Gold et al. |
| 2013/0115971 A1 | 5/2013 | Marti et al. |
| 2013/0116921 A1 | 5/2013 | Kasargod |
| 2013/0138314 A1 | 5/2013 | Viittala |
| 2013/0211711 A1 | 8/2013 | Kelly et al. |
| 2013/0285849 A1 | 10/2013 | Ben-Moshe |
| 2013/0297204 A1 | 11/2013 | Bartels |
| 2014/0024354 A1 | 1/2014 | Haik et al. |
| 2014/0070991 A1 | 3/2014 | Zhong et al. |
| 2014/0121960 A1 | 5/2014 | Park |
| 2014/0327547 A1 | 11/2014 | Johnson et al. |
| 2015/0018008 A1 | 1/2015 | Schlesinger et al. |
| 2015/0073697 A1 | 3/2015 | Barrett et al. |

FOREIGN PATENT DOCUMENTS

| | | | |
|---|---|---|---|
| CN | 101109808 B | 1/2008 | |
| CN | 101251589 A | 8/2008 | |
| CN | 101675597 A | 2/2010 | |
| CN | 102006550 A | 4/2011 | |
| CN | 102204374 A | 9/2011 | |
| DE | 10042983 A1 | 3/2002 | |
| GB | 2431261 A | 4/2007 | |
| JP | 04364491 A * | 12/1992 | ............... G01S 5/14 |
| JP | 2007-083678 | 3/1995 | |
| JP | 2008-271277 | 10/1996 | |
| JP | 10132593 A | 5/1998 | |
| JP | 2011-153446 | 8/1999 | |
| JP | 2002-328035 | 11/2002 | |
| JP | 2004-317160 | 11/2004 | |
| KR | 19970071404 | 11/1997 | |
| KR | 20040033141 A | 4/2004 | |
| KR | 20040050550 A | 6/2004 | |
| RU | 8141 | 10/1998 | |
| WO | WO 9800787 | 1/1998 | |
| WO | 2009/039161 A2 | 3/2009 | |
| WO | 2012/085876 A2 | 6/2012 | |

OTHER PUBLICATIONS

"Non-Final Office Action", U.S. Appl. No. 12/954,545, (Jun. 15, 2012),9 pages.

Cabero, Jose M., et al., "Indoor People Tracking Based on Dynamic Weighted MultiDimensional Scaling", MSWIM '07, Oct. 22-26, 2007, Chania, Crete Island, Greece, available at <http://www.ri.cmu.edu/pub_files/pub4/maria_cabero_jose_2007_1/maria_cabero_jose_2007_1.pdf>, (Oct. 22, 2007), 8 pages.

Chun, Byung-Gon et al., "CloneCloud: Elastic Execution between Mobile Device and Cloud", In Proceedings of EuroSys 2011 Available at <http://eurosys2011.cs.uni-salzburg.at/pdf/eurosys2011-chun.pdf>, (Apr. 2011), 14 pages.

Collin, Jussi et al., "Indoor Positioning System using Accelerometry and High Accuracy Heading Sensors", In Proceedings of GPS/GNSS 2003, Available at <http://plan.geomatics.ucalgary.ca/papers/gps03jussic.pdf>, (Sep. 2003), pp. 1-7.

De Moraes, Luis F., et al., "Calibration-Free WLAN Location System Based on Dynamic Mapping of Signal Strength", 9th Symposium on Modeling, Analysis, and Simulation of Wireless and Mobile Systems, Oct. 2-6, 2006, MobiWac '06, Torremolinos, Malaga, Spain, available at <http//:www.ravel.ufrj.br/arquivosPublicacoes/WAC11-demoraes.pdfs>, (Oct. 2, 2006), 8 pages.

Jimenez, A. R., et al., "A Comparison of Pedestrian Dead-Reckoning Algorithms using a Low-Cost MEMS IMU", WISP 2009, 6th IEEE International Symposium on Intelligent Signal Processing, Aug. 26-28, 2009, Budapest, Hungary, available at <http://www.iai.csic.es/users/fseco/papers/WISP2009Jimenez.pdf>, (Aug. 26, 2009), pp. 37-42.

Jin, Yunye et al., "A Robust Dead-Reckoning Pedestrian Tracking System with Low Cost Sensors", 2011 IEEE International Conference on Pervasive Computing and Communications (PerCom), Seattle, WA, Mar. 21-25, 2011, available at <http://www.ami-lab.org/uploads/Publications/Conference/WP2/Robust%20Dead-Reckoning%20Pedestrian%20Tracking%20System%20with%20Low%20Cost%20Sensors.pdf>, (Mar. 21, 2011), pp. 222-230.

Koyuncu, Hakan et al., "A Survey of Indoor Positioning and Object Locating Systems", IJCSNS International Journal of Computer Science and Network Security, vol. 10, No. 5, May 2010, available at <http://paper.ijcsns.org/07_book/201005/20100518.pdf>, (May 2010), pp. 121-128.

LaChapelle, Gerard "GNSS Indoor Location Technologies", Journal of Global Positioning Systems (2004) vol. 3, No. 1-2, Available at <http://www.gmat.unsw.edu.au/wang/jgps/v3n12/v3n12p01.pdf>, (Nov. 15, 2004), pp. 2-11.

Paul, Anindya S., et al., "Wi-Fi Based Indoor Localization and Tracking Using Sigma-Point Kalman Filtering Methods", IEEE/ION Position, Location and Navigation Symposium, May 5-8, 2008, available at <http//:www.cse.ogi.edu/~anindya/Paul_Wan_Plans08.pdf>, (May 5, 2008), 14 pages.

Rogoleva, Luba "Crowdsourcing Location Information to Improve Indoor Localization", Master Thesis, available at <http://e-collection.ethbib.ethz.ch/eserv/eth:1224/eth-1224-01.pdf>, (Apr. 30, 2010), 91 pages.

Shin, Seung H., et al., "Sit-Down & Stand-Up Awareness Algorithm for the Pedestrian Dead Reckoning", GNSS '09, May 3-6, 2009, available at <http://s-space.snu.ac.kr/bitstream/10371/27736/1/Sit-Down%20&%20Stand-Up%20Awareness%20Algorithm%20for%20the%20Pedestrian%20Dead%20Reckoning.pdf>, (May 3, 2009), 6 pages.

Toledo-Moreo, Rafael et al., "Lane-Level Integrity Provision for Navigation and Map Matching With GNSS, Dead Reckoning, and Enhanced Maps", IEEE Transactions on Intelligent Transportation Systems, vol. 11, No. 1, Available at <http://ieeexplore.ieee.org/stamp/stamp.jsp?tp=&arnumber=5286855>, (Mar. 2010), pp. 100-112.

Toledo-Moreo, Rafael et al., "Performance Aspects of Navigation Systems for GNSS-Based Road User Charging", In Proceedings of ION GNSS 2010, Available at <http://ants.inf.um.es/~josesanta/doc/ION_GNSS10.pdf>, (Sep. 2010), 9 pages.

Wendlandt, Kai et al., "Continuous Location and Direction Estimation with Multiple Sensors Using Particle Filtering", International Conference on Multisensor Fusion and Integration for Intelligent Systems, 2006 IEEE, Available at <http://ieeexplore.ieee.org/stamp/stamp.jsp?arnumber=04042026>, (Sep. 2006), 6 pages.

Xuan, Yiguang et al., "Crowd Sourcing Indoor Maps with Mobile Sensors", MUS '10, Dec. 6-9, 2010, available at <http://www.ocf.berkeley.edu/~xuanyg/IndoorMap_Mobiquitous2010_ver2.pdf>, (Dec. 6, 2010), 12 pages.

Zhu, et al., "Indoor/Outdoor Location of Cellular Handsets Based on Received Signal Strength", Electronics Letters, vol. 41, No. 1, available at <http://ieeexplore.ieee.org/stamp/stamp.jsp?arnumber=01543256>, (Jan. 6, 2005), 2 pages.

U.S. Appl. No. 12/954,545, filed Nov. 24, 2010, Yang.
U.S. Appl. No. 13/183,050, filed July 14, 2011, Sidhu.
U.S. Appl. No. 13/284,128, filed Oct. 28, 2011, Sidhu.
U.S. Appl. No. 13/325,065, filed Dec. 14, 2011, Sidhu.

Beard, K., et al., "Estimating positions and paths of moving objects", Temporal Representation and Reasoning, 2000. TIME 2000. Proceedings. Seventh International Workshop on; Digital Object Identifier: 10.1109/TIME.2000.856597 Publication Year: 2000, pp. 155-162.

(56) References Cited

OTHER PUBLICATIONS

Billinghurst, Mark, et al., "An Evaluation of Wearable Information Spaces", Proceedings of the Virtual Reality Annual International Symposium, 1998, 8 pages.
Billinghurst, Mark, et al., "Research Directions in Wearable Computing", University of Washington, May 1998, 48 pages.
Billinghurst, Mark, et al., "Wearable Devices: New Ways to Manage Information", IEEE Computer Society, Jan. 1999, pp. 57-64.
Chen, Guanling, et al., "A Survey of Context-Aware Mobile Computing Research," Dartmouth Computer Science Technical Report, 2000, 16 pages.
Choi, Jae-Hyeong,et al., "Performance evaluation of traffic control based on geographical information", Intelligent Computing and Intelligent Systems, 2009. ICIS 2009. IEEE International Conference on; vol. 3; Publication Year: 2009, pp. 85-89.
Goyal, Vishal, "MEMS based motion sensing design," retrieved at <<http://eeherald.com/section/design-guide/mems_application.html>>, EE Herald, retrieved Jul. 9, 2012, 2 pages.
Gusenbauer, et al., "Self-Contained Indoor Positioning on Off-The-Shelf Mobile Devices", retrieved at <<http://ieeexplore.ieee.org/stamp/stamp.jsp?tp=&arnumber=05646681>>, International Conference on Indoor Positioning and Indoor Navigation (IPIN), Sep. 2010, 9 pages.
Harter, Andy, et al., "A Distributed Location System for the Active Office," IEEE Network, 1994, pp. 62-70.
Horvitz, Eric, et al., "Attention-Sensitive Alerting in Computing Systems", Microsoft Research, Aug. 1999.
Horvitz, Eric, et al., "In Pursuit of Effective Handsfree Decision Support: Coupling Bayesian Inference", Speech Understanding, and User Models,1995, 8 pages.
Joachims, T., "Text categorization with support vector machines: learning with many relevant features", Machine Learning, European Conference on Machine Learning, Apr. 21, 1998, pp. 137-142.
Kostov, V., et al., "Travel destination prediction using frequent crossing pattern from driving history", Intelligent transportation Systems, 2005. Proceedings. 2005 IEEE; Digital Object Identifier: 10.1109/ITSC.2005.1520182 Publication Year: 2005, pp. 343-350.
Krumm, "Predestination: Where Do You Want to Go Today?"; Computer; vol. 40, Issue 4; Apr. 2007; pp. 105-107.
Lee, Junghoon, et al., "Design and implementation of a movement history analysis frame-work for the Taxi telematics system", Communications, 2008. APCC 2008. $14^{th}$ Asia-Pacific Conference on; Publication Year: 2008, pp. 1-4.
Liu, Feng, et al., "Remaining Delivery Time Estimation Based Routing for Intermittently Connected Mobile Networks", Distributed Computing Systems Workshops, 2008. ICDCS '08. $28^{th}$ International Conference, Publication Year: 2008, pp. 222-227.
Losee, Robert M. Jr., "Minimizing information overload: the ranking of electronic messages", Journal of Information Science 15, Elsevier Science Publishers B.V., 1989, pp. 179-189.
Miyashita, K. et al., "A Map Matching Algorithm for Car Navigation Systems that Predict User Destination", Advanced Information Networking and Applications—Workshops, 2008. AINAW 2008. $22^{nd}$ International Conference, Publication Year: 2008, pp. 1551-1556.
Rhodes, Bradley J., "Remembrance Agent: A continuously running automated information retrieval system", The Proceedings of the First International Conference on the Practical Application of Intelligent Agents and Multi Agent Technology,1996, pp. 487-495.
Rhodes, Bradley J., "The Wearable Remembrance Agent: A System for Augmented Memory", Personal Technologies Journal Special Issue on Wearable Computing, 1997, 12 pages.
Rhodes, Bradley J., "The Wearable Remembrance Agent: A System for Augmented Theory", The Proceedings of the First International Symposium on Wearable Computers, Oct. 1997, pp. 123-128.
Sananmongkhonchai, S. et al., "Cell-based traffic estimation from multiple GPS-equipped cars", 2009 IEEE Region 10 Conference Publication Year: 2009, pp. 1-6.
Schilit, Bill, et al., "Context-Aware Computing Applications", In Proceedings of the Workshop on Mobile Computing Systems and Applications, Dec. 1994, pp. 85-90.
Schilit, Bill, et al., "Customizing Mobile Applications", Proceedings USENIX Symposium on Mobile and Location Independent Computing, Aug. 1993, 9 pages.
Schilit, Bill, et al., "Disseminating Active Map Information to Mobile Hosts", IEEE Network, 1994 pp. 22-32, vol. 8—No. 5.
Schilit, Bill, et al., "The ParcTab Mobile Computing System", IEEE WWOS-IV, 1993, 4 pages.
Schilit, William Noah, "A System Architecture for Context-Aware Mobile Computing", Columbia University, 1995, 153 pages.
Sidhu, et al., "Multi-Stage Dead Reckoning for Crowd Sourcing," U.S. Appl. No. 13/284,128, filed Oct. 28, 2011, 42 pages.
Simmons, R, et al, "Learning to Predict Driver Route and Destination Intent", Intelligent Transportation Systems Conference, 2006. IEEE; Digital Object Identifier: 10.1109/ITSC.2006.1706730 Publication Year: 2006, pp. 127-132.
Spreitzer, Mike, et al., "Providing Location Information in a Ubiquitous Computing Environment", SIGOPS '93, 1993, pp. 270-283.
Spreitzer, Mike, et al., "Architectural Considerations for Scalable, Secure, Mobile Computing with Location Information", In the $14^{th}$ International Conference on Distributed Computing Systems, Jun. 1994, pp. 29-38.
Spreitzer, Mike, et al., "Scalable, Secure, Mobile Computing with Location Information", Communications of the ACM, vol. 36—No. 7, Jul. 1993, 1 page.
Starner, Thad Eugene, "Wearable Computing and Contextual Awareness", Massachusetts Institue of Technology, Jun. 1999, 248 pages (in two PDFs).
Terada, T, et al., "Design of a Car Navigation System that Predicts User Destination", Mobile Data Management, 2006. MDM 2006. $7^{th}$ International Conference on; Publication Year: 2006, pp. 145-145.
Theimer, Marvin, et al., "Operating System Issues for PDA's", in Fourth Workshop on Workstation Operating Systems, 1993, 7 pages.
Vaughan-Nichols, S.J., "Will Mobile Computing's Future Be Location, Location, Location?", Computer; vol. 42, Issue: 2 Digital Object Identifier: 10.1109/MC.2009.65; Publication Year: 2009, pp. 14-17.
Want, Roy, "Active Badges and Personal Interactive Computing Objects", IEEE Transactions on Consumer Electronics, vol. 38—No. 1, 1992, 11 pages.
Want, Roy, et al., "The Active Badge Location System", ACM Transactions on Information Systems, vol. 10—No. 1, Jan. 1992, pp. 91-102.
Wei, Chien-Hung, et al., "Development of Freeway Travel Time Forecasting Models by Integrating Different Sources of Traffic Data", IEEE Transactions on Vehicular Technology; vol. 56, Issue: 6, Part: 2; Nov. 2007, pp. 3682-3694.
Weiser, Mark, "Some Computer Science Issues in Ubiquitous Computing", Communications of the ACM, vol. 36—No. 7, Jul. 1993, pp. 75-84.
Weiser, Mark, "The Computer for the $21^{st}$ Century", Scientific American, Sep. 1991, 8 pages.
Workshop on Wearable Computing Systems, Aug. 19-21, 1996.
Wu, Yan-Jing, et al., "A dynamic navigation scheme for vehicular ad hoc networks", Networked Computing and Advanced Information Management (NCM), 2010 Sixth International Conference on; Publication Year: 2010, pp. 231-235.
Xie, M. et al., "Development of Navigation System for Autonomous Vehicle to Meet the DARPA Urban Grand Challenge", Intelligent Transportation Systems Conference, 2007. ITSC 2007. IEEE; Sep. 30-Oct. 3, 2007, Seattle, WA; pp. 767-772.
Ye, Qian, et al, "Predict Personal Continuous Route", 2008. $11^{th}$ International IEEE Conference on Intelligent Transportation Systems; Oct. 12-15, 2008, Beijing, China; pp. 587-592.
PCT Application Serial No. PCT/US2008/067808, International Search Report and Written Opinion dated Dec. 12, 2008; 8 pages.
PCT Application Serial No. PCT/US2006/034608, International Search Report dated Jan. 15, 2007; 2 pages.

(56) References Cited

OTHER PUBLICATIONS

PCT Application Serial No. PCT/US00/20685; International Search Report dated Sep. 29, 2003; 3 pages.
Russian Patent Appln. 2008112196/11; Office Action dated Jun. 8, 2010.
Sidhu, Gursharan S., et al., "Activating and Deactivating Sensors for Dead Reckoning", U.S. Appl. No. 13/183,050, (Jul. 14, 2011), 48 pages.
Sidhu, Gursharan S., et al., "Crowd Sourcing Based on Dead Reckoning", U.S. Appl. No. 13/183,124, (Jul. 14, 2011), 48 pages.
Yang, Zongxiang "Path Progression Matching for Indoor Positioning Systems", U.S. Appl. No. 12/954,545, (Nov. 24, 2010), 43 pages.
Ghasemzahdeh et al., "Action Coverage Formulation for Power Optimization in Body Sensor Networks," in Proceedings of the 2008 Asia and South Pacific Design Automation Conference, Jan. 2008, IEEE Computer Society Press, pp. 446-451.
Non-Final Office Action mailed Sep. 24, 2013 from U.S. Appl. No. 13/183,050, 11 pages.
Non-Final Office Action mailed Aug. 15, 2014 from U.S. Appl. No. 13/284,128, 28 pages.
Response to Non-Final Office Action filed Nov. 17, 2014 from U.S. Appl. No. 13/284,128, 15 pages.
Request for Examination and Voluntary Amendment filed Sep. 2, 2011 in the Canadian Patent Application No. 2,620,587, 51 pages.
Office Action mailed Mar. 20, 2009 from Chinese Patent Application No. 200680036290.9, 10 pages.
Second Office Action mailed Sep. 4, 2009 from Chinese Patent Application No. 200680036290.9, 7 pages.
Response to Second Office Action filed Nov. 4, 2009 from Chinese Patent Application No. 200680036290.9, 12 pages.
Notice of Allowance mailed Jan. 22, 2010 from Chinese Patent Application No. 200680036290.9, 4 pages.
Extended European Search Report mailed Jun. 14, 2012 from European Patent Application No. 06802991.7, 6 pages.
Office Action mailed Sep. 9, 2011 from Philippine Patent Application No. 1-2008-500513, 1 page.
Notice of Rejection and translation mailed May 31, 2011 from Japanese Patent Application No. 2008-533377, 6 pages.
Response filed Aug. 25, 2011 from Japanese Patent Application No. 2008-533377, 2 pages.
Notice of Allowance mailed Dec. 16, 2011 from Japanese Patent Application No. 2008-533377, 6 pages.
Request for Examination and Amendment filed Aug. 26, 2011 from Korean Patent Application No. 10-2008-7007693, 22 pages.
Response filed Sep. 26, 2012 to the Office Action mailed Jul. 31, 2012 from Malaysian Patent Application No. PI 20080636, 9 pages.
Notice of Allowance mailed Aug. 30, 2013 from Malaysian Patent Application No. PI 20080636, 3 pages.
Response filed Apr. 29, 2010 to the Examination Report mailed Oct. 12, 2009 from New Zealand Patent Application No. 566701, 17 pages.
Examination Report Dated May 18, 2010 from New Zealand Patent Application No. 566701, 1 page.
Response filed May 24, 2010 to the Examination Report mailed May 18, 2010 from New Zealand Patent Application No. 566701, 4 pages.
Notice of Acceptance mailed Jun. 11, 2010 from New Zealand Patent Application No. 566701, 1 page.
Office Action mailed Mar. 30, 2010 and English comments from Russian Patent Application No. 20081121996, 6 pages.
Response filed May 13, 2010 from Russian Patent Application No. 20081121996, 8 pages.
Amendment filed Apr. 9, 2009 from South African Patent Application No. 2008/02681, 3 pages.
Response filed Jul. 22, 2009 to the Office Action mailed Mar. 20, 2009 from Chinese Patent Application No. 200680036290.9, 71 pages.
Examination Report mailed Oct. 12, 2009 from New Zealand Patent Application No. 566701, 2 pages.

Non-Final Office Action mailed Dec. 12, 2012 from U.S. Appl. No. 13/190,121, 8 pages.
Notice of Allowance mailed Sep. 4, 2012 from U.S. Appl. No. 13/190,121, 8 pages.
Response/Amendment and Reply filed Apr. 19, 2012 from U.S. Appl. No. 13/190,121, 9 pages.
Non-Final Office Action mailed Jan. 19, 2012 from U.S. Appl. No. 13/190,121, 8 pages.
Restriction Requirement mailed Feb. 26, 2009 from U.S. Appl. No. 11/733,701, 9 pages.
Response to Restriction Requirement filed Mar. 5, 2009 from U.S. Appl. No. 11/733,701, 2 pages.
Non-Final Office Action mailed Mar. 26, 2009 from U.S. Appl. No. 11/733,701, 11 pages.
Response filed Jun. 26, 2009 to the Non-Final Office Action mailed Mar. 26, 2009 from U.S. Appl. No. 11/733,701, 11 pages.
Final Office Action mailed Oct. 21, 2009 from U.S. Appl. No. 11/733,701, 14 pages.
Response filed Dec. 2, 2009 to the Final Office Action mailed Oct. 21, 2009 from U.S. Appl. No. 11/733,701, 10 pages.
Non-Final Office Action mailed Dec. 23, 2011 from U.S. Appl. No. 11/733,701, 13 pages.
Response filed Mar. 27, 2012 to the Non-Final Office Action mailed Dec. 23, 2011 from U.S. Appl. No. 11/733,701, 12 pages.
Notice of Non-Compliant Amendment mailed May 23, 2012 from U.S. Appl. No. 11/733,701, 2 pages.
Response filed Sep. 24, 2012 to the Non-Final Office Action mailed Jun. 15, 2012 from U.S. Appl. No. 12/954,545, 13 pages.
Applicant Initiated Interview Summary mailed Dec. 26, 2013 from U.S. Appl. No. 13/184,050, 3 pages.
Applicant Summary of Interview with Examiner filed Oct. 5, 2012 from U.S. Appl. No. 12/954,545, 2 pages.
Applicant Initiated Interview Summary mailed Oct. 16, 2012 from U.S. Appl. No. 12/954,545, 3 pages.
Notice of Allowance mailed Nov. 26, 2012 from U.S. Appl. No. 12/954,545, 9 pages.
Supplemental Amendment filed Feb. 13, 2013 from U.S. Appl. No. 12/954,545, 11 pages.
Non-Final Office Action mailed Mar. 1, 2013 from U.S. Appl. No. 12/954,545, 8 pages.
Response filed Jun. 24, 2013 to the Non-Final Office Action mailed Mar. 1, 2013 from U.S. Appl. No. 12/954,545, 12 pages.
Notice of Allowance mailed Jul. 11, 2013 from U.S. Appl. No. 12/954,545, 10 pages.
Applicant Initiated Interview Summary mailed Aug. 26, 2013 from U.S. Appl. No. 12/954,545, 3 pages.
Non-Final Rejection mailed Jun. 18, 2015 from U.S. Appl. No. 13/184,050, 24 pages.
Response to Final Office Action filed Feb. 25, 2015 from U.S. Appl. No. 13/184,050, 17 pages.
Final Office Action mailed Nov. 26, 2014 from U.S. Appl. No. 13/184,050, 22 pages.
Response filed Oct. 10, 2014 to the Non-Final Office Action mailed Jun. 11, 2014 from U.S. Appl. No. 13/184,050, 11 pages.
Non-Final Office Action mailed Jun. 11, 2014 from U.S. Appl. No. 13/183,050, 19 pages.
Official Action mailed Mar. 25, 2014 Withdrawing/Vacating previous Office Action from U.S. Appl. No. 13/184,050, 2 pages.
Kargl et al., "Smart Reminder—Personal Assistance in a Mobile Computing Environment," Proceedings of the International Conference on Pervasive Computing, Aug. 26-28, 2002, 6 pages.
Krumm et al., "The Microsoft Multiperson Location Survey", (MSR-TR-2005-103), Aug. 2005, Microsoft Research, 4 pages.
Kanoh et al., "Knowledge Based Genetic Algorithm for Dynamic Route Selection," Knowledge-Based Intelligent Engineering Systems and Allied Technologies, 2000, Proceedings Fourth International Conference on vol. 2, pp. 616-619 (4 pages).
Marmasse et al., "A User-Centered Location Model", Personal and Ubiquitos Computing, 2002(6), pp. 318-321 (4 pages).
Patterson et al., "Opportunity Knocks: A System to Provide Dobnitive Assistance with Transportation Services", in UbiComp 2004: Ubiquitous Computing, 2004, Nottingham, UK; Springer, 18 Pages.

(56) References Cited

OTHER PUBLICATIONS

Rish, "An Empirical Study of the Naïve Bayes Classifier", IJCAI-01 Workshop on Empirical Methods in AI, Nov. 2, 2001, 7 Pages.
Hu et al., "Summary of Travel Trends", 2001 National Household Survey, Dec. 2004, U.S. Department of Transportation, U.S. Federal Highway Administration, 135 pages.
Notice of Allowance mailed Jun. 5, 2015 from U.S. Appl. No. 13/325,065, 6 pages.
Notice of Allowance mailed Dec. 31, 2014 from U.S. Appl. No. 13/325,065, 5 pages.
Notice of Allowance mailed Sep. 19, 2014 from U.S. Appl. No. 13/325,065, 7 pages.
Notice of Allowance mailed Jun. 4, 2014 from U.S. Appl. No. 13/325,065, 12 pages.
Response filed Jan. 23, 2014 to the Non-Final Office Action mailed Oct. 24, 2013 from U.S. Appl. No. 13/325,065, 20 pages.
Non-Final Office Action mailed Oct. 24, 2013 from U.S. Appl. No. 13/325,065, 31 pages.
Non-Final Office Action mailed Sep. 3, 2009 from U.S. Appl. No. 11/426,540, 8 pages.
Response filed Nov. 24, 2009 to the Non-Final Office Action mailed Jun. 26, 2009 from U.S. Appl. No. 11/426,540, 9 pages.
Non-Final Office Action mailed Apr. 6, 2010 from U.S. Appl. No. 11/426,540, 9 pages.
Response filed Jul. 6, 2010 to the Non-Final Office Action mailed Apr. 6, 2010 from U.S. Appl. No. 11/426,540, 11 pages.
Non-Final Office Action mailed Oct. 14, 2010 from U.S. Appl. No. 11/426,540, 16 pages.
Response filed Jan. 25, 2011 to the Non-Final Office Action mailed Oct. 14, 2010 from U.S. Appl. No. 11/426,540, 12 pages.
Notice of Allowance mailed Apr. 15, 2011 from U.S. Appl. No. 11/426,540, 10 pages.
Notice of Panel Decision from Pre-Appeal Brief Review mailed May 19, 2015 from U.S. Appl. No. 13/190,121, 2 pages.
Pre-Appeal Brief Request and Notice of Appeal filed Apr. 28, 2015 from U.S. Appl. No. 13/190,121, 8 pages.
Final Office Action mailed Jan. 28, 2015 from U.S. Appl. No. 13/190,121, 12 pages.
Response/Amendment and Reply filed Sep. 30, 2014 to the Non-Final Office Action mailed Jul. 1, 2014 from U.S. Appl. No. 13/190,121, 15 pages.
Non-Final Office Action mailed Jul. 1, 2014 from U.S. Appl. No. 13/190,121, 11 pages.
Response/Amendment and Reply filed Apr. 15, 2014 to the Non-Final Office Action mailed Jan. 15, 2014 from U.S. Appl. No. 13/190,121, 14 pages.
Non-Final Office Action mailed Jan. 15, 2014 from U.S. Appl. No. 13/190,121, 9 pages.
Response/Amendment and Reply filed Sep. 25, 2013 to the Non-Final Office Action mailed Jun. 27, 2013 from U.S. Appl. No. 13/190,121, 11 pages.
Non-Final Office Action mailed Jun. 27, 2013 from U.S. Appl. No. 13/190,121, 10 pages.
Response/Amendment and Reply filed Mar. 11, 2013 to the Non-Final Office Action mailed Dec. 12, 2012 from U.S. Appl. No. 13/190,121, 11 pages.
Ashbrook et al., "Using GPS to Learn Significant Locations and Predict Movement Across Multiple Users", Personal and Ubiquitous Computing,7(5), 2003, pp. 275-286 (15 pages).
Biegel et al., "A Framework for Developing Mobile, Context-Aware Applications," Proceedings of the Second IEEE Annual Conference on Pervasive Computing and Communications, Mar. 14-17, 2004, pp. 361-365 (5 pages).
Bisdikian et al., "Intelligent Pervasive Middleware for Context-Based and Localized Telematics Services," Proceedings of the Second International ACM Conference on Mobile Commerce, Sep. 2002, pp. 15-24 (10 pages).
Chen et al., "HarpiaGrid: A Reliable Grid-based Routing Protocol for Vehicular Ad Hoc Networks", Intelligent Transportation Systems, ITSC 2008, 11th International IEEE Conference, pp. 383-388 (6 pages).
Coyne et al., "Comparison of Differentially Corrected GPS Sources for Support of Site-Specific Management in Agriculture", Kansas State University Agricultural Experiment Station and Cooperative Extension Service, Jul. 2003, 35 pages.
Hu et al., "Simulation-Assignment-Based Travel Time Prediction Model for Traffice Corridors," Intelligent Transporation Systems, IEEE Transactions, vol. PP, Issue 99, 2012, pp. 1-10 (10 pages).
Vanajakshi et al., "Support Vector Machine Technique for the Short Term Prediction of Travel Time," Intelligent Vehicles Symposium, 2007 IEEE, pp. 600-605 (6 pages).
Kanoh et al., "Evaluation of GA-based Dynamic Rout Guidance for Car Navigation using Cellular Automata," Intelligent Vehicle Symposium, 2002, IEEE, vol. 1, pp. 178-183 (6 pages).
Kanoh et al., "Route Guidance with Unspecific Staging Posts using Genetic Algorithm for Car Navigation Systems," Intelligent Transportation Systems, 2000, IEEE, pp. 119-124 (6 pages).
Lai et al., "Hierarchical Incremental Pat Planning and Situation-Dependent Optimized Dynamic Motion Planning Considering Accelerations," Systems, Man, and Cybernetics, Part B: Cybernetics, IEEE Transactions on vol. 37, Issue 6, 2007, pp. 1541-1554 (14 pages).
Cheng, et al., "Location Prediction Algorithms for Mobile Wireless Systems," Wireless Internet Handbook: Technologies, Standards, and Applications, 2003, CRC Press, Boca Raton, FL, pp. 245-263 (17 pages).
Hariharan, et al., "Project Lachesis: Parsing and Modeling Location Histories," Geographic Information Science: Third International Conference, GI Science 2004, Adelphi, MD, Springer-Verlag GmbH, 19 pages.
Liao, et al., "Learning and Inferring Transportation Route ins," Proceedings of the 19th National Conference on Artificial Intelligence (AAAI), 2004, San Jose, CA, 6 pages.
Gogate, et al., "Modeling Transportation Routines using Hybrid Dynamic Mixed Networks," Uncertainty in Artificial Intelligence (UAI), 2005, 8 pages.
Angermann, et al., "Software Represenation for Heterogeneous Location Data Sources Using Probability Density Functions," International Symposium on Location Based Services for Cellular Users (LOCELLUS), 2001, Munich, Germany, 11 pages.
Elfes et al., "Using Occupancy Grids for Mobile Robot Perception and Navigation," IEEE Computer, 1989, 22(6), pp. 46-57 (12 pages).
Krumm, "Predestination: Inferring Destinations from Partial Trajectories," UbiComp 2006: Ubiquitous Computing 8th International Conference, Sep. 17-21, 2006, 18 pages.
Krumm, John, "Real Time Destination Prediction Based on Efficient Routes," SAE Technical Paper, Paper No. 2006-1-0811, Apr. 3, 2006, 6 pages.
Krumm et al., The Microsoft Multiperson Location Survey (MSR-TR-2005-103), Aug. 2005, Microsoft Research, 4 pages.
Karbassi et al., "Vehicle Route Prediction and Time of Arrival Estimation Techniques for Improved Transportation System Management," Proceedings of the Intelligent Vehicles Symposium, 2003, pp. 511-516 (6 pages).
Notice of Allowance, Office Action Appendix and Applicant-Initiated Interview Summary mailed Oct. 20, 2015 from U.S. Appl. No. 13/183,050, 20 pages.
Corrected Notice of Allowability mailed Oct. 22, 2015 from U.S. Appl. No. 13/325,065, 2 pages.
Thiagarajan et al., "Cooperative Transit Tracking Using Smart-Phones," SenSy'10, Zurich, Switzerland, Nov. 3-5, 2010, pp. 85-98, 14 pages.
Samaan et al., "A User Centric Mobility Prediction Approach Based on Spatial Conceptual Maps," 2005 IEEE International Conference on Communications, vol. 2, pp. 1413-1417, 5 pages.
Goldstone et al., "Group Path Formation," IEEE Transaction on Systems, Man and Cybernetics, Part A: Systems and Humans, 2006, vol. 36, Issue 3, pp. 611-620, 10 pages.

(56) References Cited

OTHER PUBLICATIONS

Notice of Allowance mailed Sep. 10, 2015 from U.S. Appl. No. 13/325,065, 6 pages.
Non-Final Office Action mailed Sep. 8, 2015 from U.S. Appl. No. 13/190,121, 12 pages.
Response filed Feb. 25, 2015 to Final Office Action mailed Nov. 26, 2014 from U.S. Appl. No. 13/183,050, 17 pages.
Non-Final Ofice Action mailed Jun. 18, 2015 from U.S. Appl. No. 13/183,050, 24 pages.
Non-Final Office Action mailed Sep. 17, 2015 from U.S. Appl. No. 13/284,128, 22 pages.
Jeong et al., "TBD: Trajectory-Based Data Forwarding for Light-Traffic Vehicular Networks," 29th IEEE International Conference on Distributed Computing Systems, Jun. 22-26, 2009, 8 pages.
Renso et al., "Wireless Network Data Sources: Tracking and Synthesizing Trajectories," retrieved at <<http://www.dsc.ufcg.edu.br/~sampaio/Livros/mobility-data-mining-and-privacy-geographic-knowledge-discover.pdf#page=84>>, 2008, pp. 73-99.
Subramanian et al., "Drive-by Localization of Roadside WiFi Networks," IEEE Infocom Conference, Apr. 13-18, 2008, 9 pages.
Response filed May 19, 2014 to Non-Final Office Action mailed May 7, 2014 from U.S. Appl. No. 13/152,299, 6 pages.
Notice of Allowance mailed Jun. 17, 2014 from U.S. Appl. No. 13/152,299, 7 pages.
Notice of Allowance mailed Oct. 31, 2014 from U.S. Appl. No. 13/152,299, 5 pages.
International Search Report & Written Opinion mailed Jan. 31, 2013 from PCT Patent Application No. PCT/US2012/40140, 9 pages.
International Preliminary Report on Patentability mailed Dec. 4, 2013 from PCT Patent Application No. PCT/US2012/40140, 7 pages.
"Ignite Where & Launch Pad", retrieved on Feb. 5, 2009 at <<http://en.oreilly.com/where2008/public/schedule/detail/2572>>, O'Reilly, Where 2.0 Conference 2008, May 2008, 4 pages.
Aalto et al., "Bluetooth and WAP Push Based Location-Aware Mobile Advertising System", retrieved on Feb. 5, 2009 at <<http://www.mediateam.oulu.fi/publications/pdf/496.pdf>>, ACM, MobiSYS '04, Jun. 6-9, 2004, Boston, MA, 10 pages.
Azizyan et al., "SurroundSense: Mobile Phone Localization Using Ambient Sound and Light", retrieved on Feb. 5, 2009 at <<http://synrg.ee.duke.edu/papers/surroundsense-poster.pdf>>, Sep. 22, 2008, 1 page.
Bahl et al., "RADAR: An In-Building RF-based User Location and Tracking System", retrieved on Feb. 5, 2009 at <<https://research.microsoft.com/en-us/um/people/padmanab/papers/infocom2000.pdf>>, Microsoft Research, Proceedings of IEEE Infocom 2000, Tel-Aviv, Israel, Mar. 2000, 10 pages.
Balakrishnan et al., "ITR: Scalable Location-Aware Monitoring (SLAM) Systems", retrieved on Feb. 5, 2009 at <<http://nms.cs.mit.edu/projects/slam/prop.pdf>>, Laboratory for Computer Science & Department of EECS, MIT, Cabridge, MA, Nov. 9, 2001, 31 pages.
Constandache et al., "Energy-Aware Localization Using Mobile Phones", retrieved on Feb. 5, 2009 at http://www.cs.duke.edu/~ionut/2008_mobisys.pdf>>, Jun. 2008, 1 page.
Flinn, Jason, "Extending Mobile Computer Battery Life through Energy-Aware Adaptation", retrieved on Feb. 5, 2009 at <<http://reports-archive.adm.cs.cmu.edu/anon/2001/CMU-CS-01-171.pdf>>, School of Computer Science, Carnegie Mellon University, Pittsburgh, PA, Dec. 2001, 165 pages.
Gaonkar et al., "Micro-Blog: Sharing and Querying Content Through Mobile Phones and Social Participation", ACM, MobiSys 2008, Jun. 17-20, 2008, Breckenridge, CO, 13 pages.
Huang et al., "Improve GPS Positioing Accuracy with Context Awareness," Jul. 31-Aug. 1, 2008, pp. 94-99, 6 pages.
Kansal et al., "Location and Mobility in a Sensor Network of Mobile Phones", retrieved on Feb. 5, 2009 at <<http://research.microsoft.com/apps/pubs/default.aspx?id=70416>>, Microsoft Research, Microsoft Corporation, Jun. 4, 2007, 6 pages.

Krumm et al., "Predestination: Inferring Destinations from Partial Trajectories", UbiComp 2006: The Eighth International Conference on Ubiquitous Computing, Sep. 17-21, 2006, Orange County, CA, 18 pages.
Krumm et al., "RightSPOT: A Novel Sense of Location for a Smart Personal Object", retrieved on Feb. 5, 2009 at <<http://research.microsoft.com/en-us/um/people/horvitz/rightspot.htm>>, Proceedings of Ubicomp 2003, Seattle, WA, 8 pages.
Lamarca et al., "Place Lab: Device Positioning Using Radio Beacons in the Wild", retrieved on Feb. 5, 2009 at <<http://www.placelab.org/publications/pubs/pervasive-placelab-2005-final.pdf>>, Proceedings of Pervasive 2005, Munich, Germany, 18 pages.
Liao et al., "Extracting Places and Activities from GPS Traces Using Hierarchical Conditional Random Fields", retrieved on Feb. 5, 2009 at <<http://ijr.sagepub.com/cgi/content/abstract/26/1/119>>, The International Journal of Robotics Research, vol. 26, No. 1, 119-134, 2007, 20 pages.
Lin et al., "Fuzzy Processing on GPS Data to Improve the Position Accuracy," Dec. 11-14, 1996, IEEE, pp. 557-562, 6 pages.
Lin et al., "Enabling Energy-Efficient and Quality Localization Services", retrieved on Feb. 5, 2009 at http://nslab.ee.ntu.edu.tw/publication/conf/qols-percom06.pdf, National Taiwan University, 2006, 4 pages.
Peng et al., "BeepBeep: A High Accuracy Acoustic Ranging System using COTS Mobile Devices", ACM, SenSys 2007, Nov. 6-9, 2007, Sydney, Australia, 14 pages.
Person, Jon, "Writing Your Own GPS Applications: Part 2", retrieved on Feb. 5, 2009 from <<http://www.codeproject.com/KB/mobile/WritingGPSApplications2.aspx>>, The Code Project, Dec. 20, 2004, 15 pages.
Ruairi et al., "An Energy-Efficient, Multi-Agent Sensor Network for Detecting Diffuse Events", retrieved on Feb, 5, 2009 at <<http://www.aaai.org/Papers/IJCAI/2007/IJCAI07-224.pdf>>, IJCAI-07, 2007, pp. 1390-1395, 6 pages.
Schindler et al., "City-Scale Location Recognition", retrieved on Feb. 5, 2009 at <<http://www.cc.gatech.edu/~phlosoft/files/schindler07cvpr2.pdf>>, IEEE Computer Society Conference on Computer Vision and Pattern Recognition (CVPR), 2007, 7 pages.
Smailagic et al., "Location Sensing and Privacy in a Context-Aware Computing Environment", IEEE Wireless Communications, Oct. 2002, pp. 10-17, 8 pages.
Sun et al., "Signal Processing Techniques in Network-Aided Positioning—A survery of state-of-the-art positioning designs", IEEE Signal Processing Magazine, Jul. 2005, 12 pages.
Youssef et al., "The Horus WLAN Location Determination System", retrieved on Feb. 5, 2009 at <<http://www.cs.umd.edu/~moustafa/papers/horus_usenix.pdf>>, Department of Computer Science, University of Maryland, 2005, 14 pages.
Zhang et al., "The Two Facets of the Exploration-Exploitation Dilemma", Proceedings of the IEEE/WIC/ACM International Conference on Intelligent Agent Technology (IAT '06), 2006, 7 pages.
Response filed Dec. 8, 2015 to the Non-Final Office Action mailed Sep. 8, 2015 from U.S. Appl. No. 13/190,121, 15 pages.
Response filed Jan. 15, 2016 to the Non-Final Office Action mailed Sep. 17, 2015 from U.S. Appl. No. 13/284,128, 16 pages.
Notice of Allowance mailed Dec. 17, 2015 from U.S. Appl. No. 13/325,065, 18 pages.
Preliminary Amendment filed Aug. 23, 2013 from U.S. Appl. No. 13/606,029, 8 pages.
Requirement for Restriction/Election mailed Jun. 25, 2015 from U.S. Appl. No. 13/606,029, 6 pages.
Response filed Jul. 21, 2015 to Requirement for Restriction/Election mailed Jun. 25, 2015 from U.S. Appl. No. 13/606,029, 8 pages.
Non-Final Office Action mailed Aug. 7, 2015 from U.S. Appl. No. 13/606,029, 16 pages.
Applicant Initiated Interview Summary mailed Nov. 17, 2015 from U.S. Appl. No. 13/606,029, 3 pages.
Response filed Nov. 17, 2015 to Non-Final Office Action mailed Aug. 7, 2015 from U.S. Appl. No. 13/606,029, 14 pages.
Final Office Action mailed Dec. 4, 2015 from U.S. Appl. No. 13/606,029, 6 pages.

(56) References Cited

OTHER PUBLICATIONS

International Search Report and Written Opinion mailed Dec. 20, 2013 from PCt Patent Application No. PCT/US2013/058350, 10 pages.
Non-Final Office Action mailed Jun. 28, 2011 from U.S. Appl. No. 12/417,752, 15 pages.
Response filed Oct. 27, 2011 to Non-Final Office Action mailed Jun. 28, 2011 from U.S. Appl. No. 12/417,752, 17 pages.
Final Office Action mailed Sep. 13, 2012 from U.S. Appl. No. 12/417,752, 18 pages.
Response filed Dec. 13, 2012 to Final Office Action mailed Sep. 13, 2012 from U.S. Appl. No. 12/417,752, 13 pages.
Non-Final Office Action mailed May 24, 2013 from U.S. Appl. No. 12/417,752, 18 pages.
Response filed Jul. 2, 2013 to Non-Final Office Action mailed May 24, 2013 from U.S. Appl. No. 12/417,752, 16 pages.
Final Office Action mailed Jul. 17, 2013 from U.S. Appl. No. 12/417,752, 18 pages.
Response filed Sep. 30, 2013 to Final Office Action mailed Jul. 17, 2013 from U.S. Appl. No. 12/417,752, 18 pages.
Non-Final Office Action mailed Oct. 29, 2013 from U.S. Appl. No. 12/417,752, 17 pages.
Response filed Dec. 23, 2013 to Non-Final Office Action mailed Oct. 29, 2013 from U.S. Appl. No. 12/417,752, 21 pages.
Final Office Action and Applicant Initiated Interview Summary mailed Feb. 25, 2014 from U.S. Appl. No. 12/417,752, 26 pages.
Requirement for Restriction/Election mailed Mar. 20, 2014 from U.S. Appl. No. 13/152,299, 6 pages.
Response filed Apr. 2, 2014 to Requirement for Restriction/Election mailed Mar. 20, 2014 from U.S. Appl. No. 13/152,299, 6 pages.
Non-Final Office Action mailed May 7, 2014 from U.S. Appl. No. 13/152,299, 4 pages.
First Office Action mailed Mar. 3, 2016 from China Patent Application No. 201380046819.5, 13 pages.
Notice of Allowance mailed Mar. 14, 2016 from U.S. Appl. No. 13/183,050, 49 pages.
Response to the Final Office Action mailed Dec. 4, 2015 filed Feb. 11, 2016 from U.S. Appl. No. 13/606,029, 9 pages.
Advisory Action mailed Feb. 23, 2016 from U.S. Appl. No. 13/606,029, 3 pages.
Notice of Allowance mailed Mar. 28, 2016 from U.S. Appl. No. 13/325,065, 11 pages.
Non-Final Office Action mailed Apr. 4, 2016 from U.S. Appl. No. 13/606,029, 15 pages.
Final Office Actiion mailed May 12, 2016 from U.S. Appl. No. 13/284,128, 58 pages.
Non-Final Office Action mailed May 5, 2016 from U.S. Appl. No. 14/504,451, 10 pages.
Kansal, Aman and Feng Zhao, "Location and Mobility in a Sensor Network of Mobile Phones," ACM SIGMM 17th International Workshop on Network and Operating Systems Support for Digital Audio & Video (NOSSDAV), Association for Computing Machinery, Inc., Urbana, IL, 2007, 6 pages.
Krumm et al., "RightSPOT: A Novel Sense of Location for a Smart Personal Object", retrieved on Feb. 5, 2009 at <<http://research.microsoft.com/en-us/um/people/horvitz/rightspot.htm>>, Proceedings of Ubicomp 2003, vol. 2864, pp. 36-43, 8 pages.
Liao et al., "Extracting Places and Activities from GPS Traces Using Hierarchical Conditional Random Fields", The International Journal of Robotics Research, vol. 26, No. 1, pp. 119-134, 2007, 17 pages.
Notice of Allowability mailed Jun. 10, 2016 from U.S. Appl. No. 13/183,050, 19 pages.
Preliminary Amendment filed Jun. 15, 2016 to U.S. Appl. No. 15/181,091, 8 pages.
Notice of Allowability mailed Jun. 7, 2016 from U.S. Appl. No. 13/325,065, 18 pages.
Response filed Jul. 18, 2016 to the Office Action mailed Mar. 3, 2016 from China Patent Application No. 201380046819.5, 10 pages.
Response filed Jul. 19, 2016 to the Office Action mailed Apr. 4, 2016 from U.S. Appl. No. 13/606,029, 17 pages.
Response and After Final Consideration Pilot Program Request filed Aug. 1, 2016 from U.S. Appl. No. 13/284,128, 13 pages.

* cited by examiner

CROWD SOURCING BASED ON DEAD RECKONING

BACKGROUND

As cellular phones have become more commonplace and powerful, the desire for certain applications to provide location-based functionality on these phones has increased. In order to provide such location-based functionality, the position of the phone needs to be known. The position of a phone can sometimes be determined based on coordinates received from a global positioning system (GPS) of the phone. However, it remains difficult to determine the position of a phone under certain circumstances, such as when the GPS of the phone is not able to determine an accurate position of the phone, or when the phone does not include GPS functionality.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, an identification is made that a device is at an anchor location. In response to the device being at an anchor location, recording of crowd sourcing data based on dead reckoning starts.

In accordance with one or more aspects, one or more signals received while the device is at each of multiple positions are identified. For each of the multiple positions, both an indication of the position and an indication of the one or more signals received while the device is at that position are recorded. The position is determined based at least in part on dead reckoning if the device is in a dead zone (e.g., an area in which a Global Navigation Satellite System cannot provide a position of the device deemed to be accurate enough).

BRIEF DESCRIPTION OF THE DRAWINGS

The same numbers are used throughout the drawings to reference like features.

DETAILED DESCRIPTION

Crowd sourcing based on dead reckoning is discussed herein. A device identifies signals it receives at a particular point in time, such as Wi-Fi signals and cell tower signals. The device records data indicating these identified signals, as well as data indicating the position of the device at that particular point in time. The position of the device can be determined using a Global Navigation Satellite System (GNSS) such as GPS. In situations in which a GNSS is not available or does not provide an accurate enough position, dead reckoning can be used to determine the position of the device. The position determined using dead reckoning can also be modified based on signals received from beacons anchored at known positions. The ability to determine the position of the device is thus extended into areas in which a GNSS is not available or does not provide an accurate enough position. When the position of the device is determined using dead reckoning various inertial sensors can be activated, and these inertial sensors can be deactivated at other times to conserve energy.

The device records data indicating the identified signals and position of the device at various times, as do other devices, and the recorded data is provided by these devices to a collection system. This data provided by the devices, also referred to as crowd sourcing data, is collected by the collection system and can subsequently be used in any of a variety of different manners.

Figure 1:
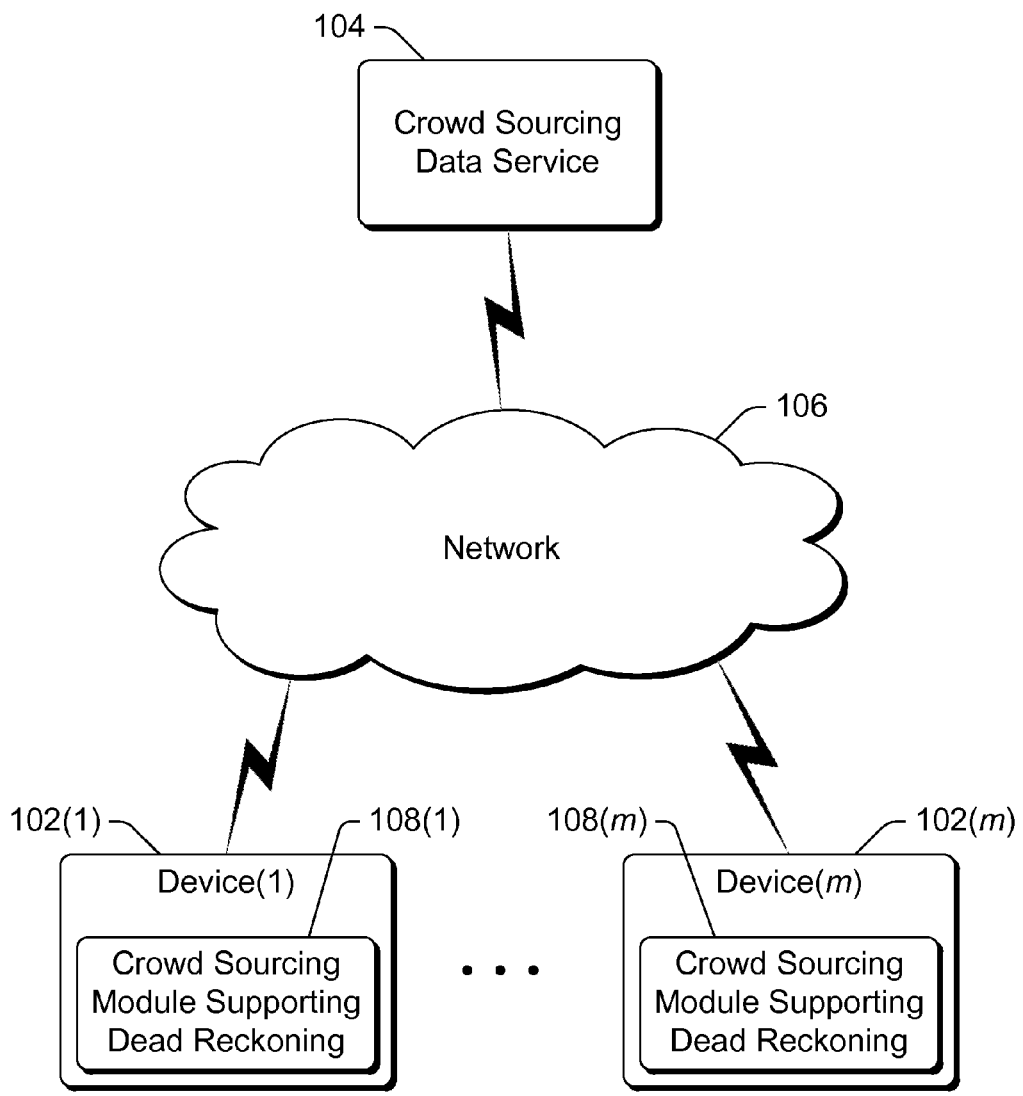
FIG. 1 illustrates an example system implementing the crowd sourcing based on dead reckoning in accordance with one or more embodiments.

FIG. 1 illustrates an example system 100 implementing the crowd sourcing based on dead reckoning in accordance with one or more embodiments. System 100 includes one or more (m) devices 102 that can communicate with a crowd sourcing data service 104 via a network 106. Network 106 can be a variety of different networks, including the Internet, a local area network (LAN), a wide area network (WAN), a telephone network, an intranet, other public and/or proprietary networks, combinations thereof, and so forth.

Each device 102 can be a variety of different types of devices, with different devices 102 being the same or different types of devices. Device 102 is typically a mobile device, the position of which is expected to change frequently over time. For example, device 102 can be a cellular or other wireless phone, a laptop or netbook computer, a tablet or notepad computer, a mobile station, an entertainment appliance, a game console, an automotive computer, and so forth. Thus, device 102 may range from a full resource device with substantial memory and processor resources (e.g., personal computers, game consoles) to a low-resource device with limited memory and/or processing resources (e.g., traditional set-top boxes, hand-held game consoles).

Device 102 records data identifying signals that device 102 receives and a corresponding position of device 102 at various points in time, as discussed in more detail below. Device 102 can also optionally provide various other functionality in addition to recording the data identifying received signals and corresponding device position at various points in time, such as a phone functionality, automotive computer functionality, gaming functionality, and so forth.

Alternatively, device 102 can be a dedicated position sensing device that supports little, if any, functionality other than recording the data identifying received signals and corresponding device position at various points in time.

Each device 102 includes a crowd sourcing module 108 that supports dead reckoning. Each crowd sourcing module 108 can use dead reckoning to determine the position of the device 102 including that module 108, as discussed in more detail below. Although illustrated as a single module, it should be noted that the functionality of module 108 can alternatively be separated into multiple modules. Data indicating this determined position of the device 102, as well as data identifying signals received by the device 102 (and optionally strengths of those signals) at that determined position, at various times is recorded by device 102. This recorded data is also referred to as crowd sourcing data, and is provided to crowd sourcing data service 104. Crowd sourcing as used herein refers to each of multiple (typically a large number, such as hundreds of thousands or more) devices providing data to a service, so the service obtains data from a crowd of devices rather than relying on data from a single device. Both the individual devices and the service play a part in the crowd sourcing.

Crowd sourcing data service 104 receives recorded data from multiple devices 102, collecting the data for subsequent use. The data collected by crowd sourcing data service 104 can be used to provide various location-based or position-based functionality. As used herein, a location refers to a general or larger geographic area rather than a precise coordinate, such as one or more buildings (e.g., home or work), a business or store, a buffer zone around a building, and so forth. A position, however, refers to a geographic area that is more precise than a location, such as a coordinate in some coordinate system (e.g., a particular latitude and/or longitude), a particular elevation, and so forth. Thus, each location can include multiple positions. Crowd sourcing data service 104 is implemented using one or more devices. The one or more devices used to implement crowd sourcing data service 104 can be a variety of different types of devices, such as server computers, desktop computers, any of the various types of devices discussed above with reference to device 102, and so forth. Service 104 can be implemented using multiple ones of the same and/or different types of devices.

In one more embodiments, the recording of data indicating the position of a device and/or the providing of the recorded data to crowd sourcing data service 104 is performed only after receiving user consent to do so. This user consent can be an opt-in consent, where the user takes an affirmative action to request that the position data be recorded before crowd sourcing module 108 performs any recording of data for the device. Alternatively, this user consent can be an opt-out consent, where the user takes an affirmative action to request that the position data not be recorded; if the user does not choose to opt out of this recording of the position data, then it is an implied consent by the user to record the position data.

Furthermore, it should be noted that the crowd sourcing based on dead reckoning techniques discussed herein can allow devices 102 to provide position data to crowd sourcing data service 104, but need not include any personal information identifying particular users of devices 102 and/or particular devices 102. For example, a device 102 can record position data and provide the position data to service 104, but no association between the device 102 and the position data need be provided to and/or maintained by service 104. Similarly, no association between the user of the device 102 and the position data need be provided to and/or maintained by service 104.

Figure 2:
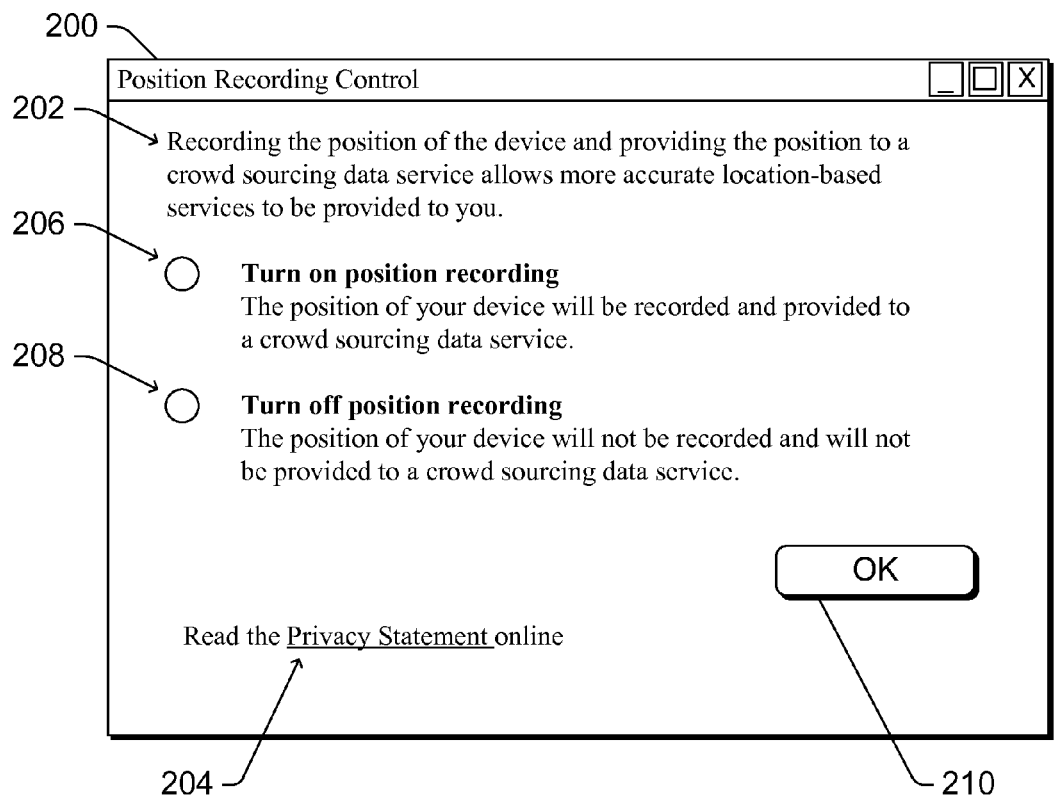
FIG. 2 illustrates an example user interface that can be displayed to a user of a device to allow the user to select whether position data for that device will be recorded and provided to a crowd sourcing data service in accordance with one or more embodiments.

FIG. 2 illustrates an example user interface that can be displayed to a user of a device to allow the user to select whether position data for that device will be recorded and provided to a crowd sourcing data service in accordance with one or more embodiments. A position recording control window 200 is displayed including a description 202 explaining to the user why the position of the device is being recorded. A link 204 to a privacy statement is also displayed. If the user selects link 204, a privacy statement is displayed, explaining to the user how the recorded position data is kept confidential and/or how no association between the position and the device (as well as the user of the device) is maintained.

Additionally, the user is able to select a radio button 206 to opt-in to the position recording, or a radio button 208 to opt-out of the position recording. Once a radio button 206 or 208 is selected, the user can select an "OK" button 210 to have the selection saved. It is to be appreciated that radio buttons and an "OK" button are only examples of user interfaces that can be presented to a user to opt-in or opt-out of the position recording, and that a variety of other conventional user interface techniques can alternatively be used. The device then proceeds to record or not record the device position in accordance with the user's selection.

Figure 3:
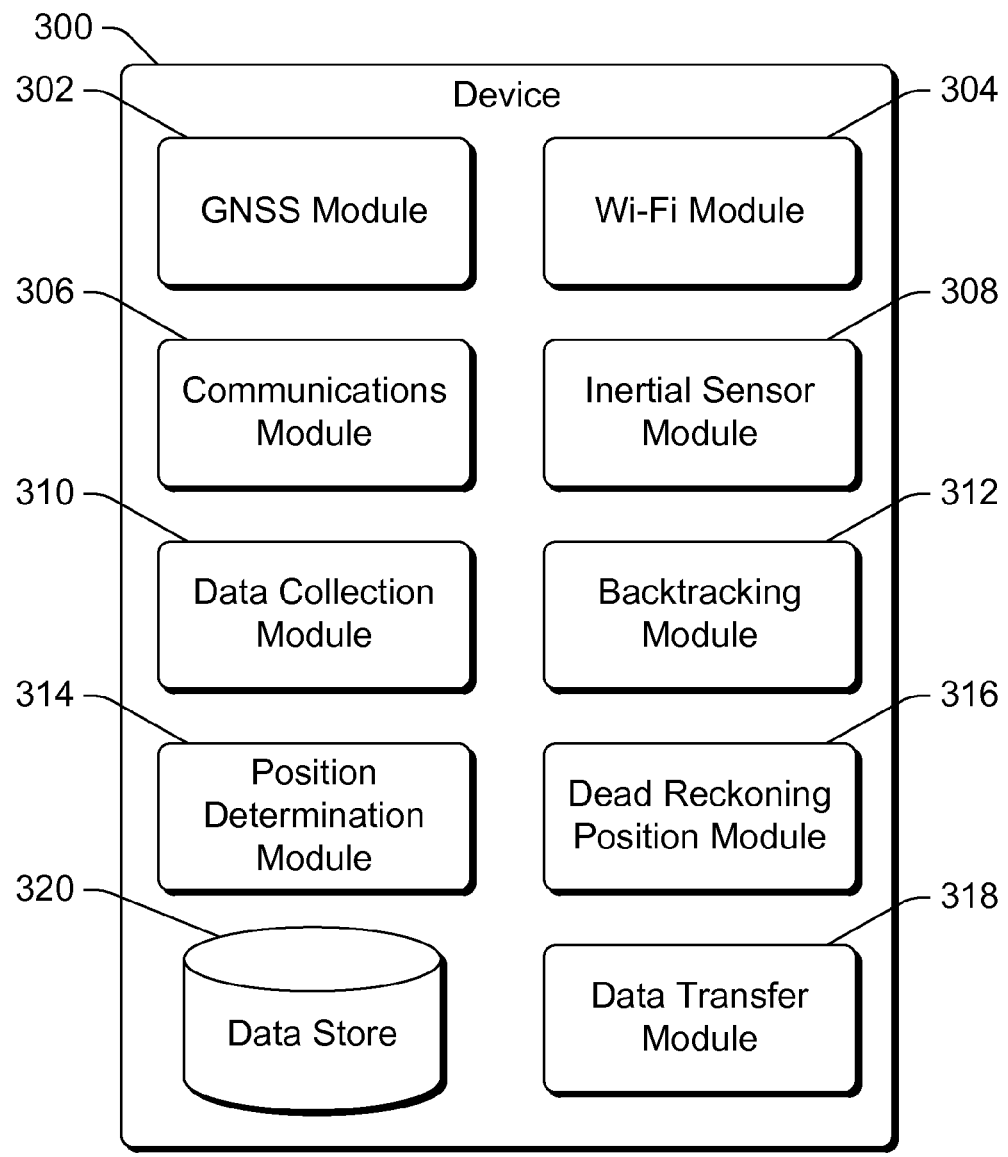
FIG. 3 illustrates an example device implementing the crowd sourcing based on dead reckoning in accordance with one or more embodiments.

FIG. 3 illustrates an example device 300 implementing the crowd sourcing based on dead reckoning in accordance with one or more embodiments. Device 300 can be, for example, a device 102 of FIG. 1. Device 300 includes a Global Navigation Satellite System (GNSS) module 302, a Wi-Fi module 304, a communications module 306, an inertial sensor module 308, a data collection module 310, a backtracking module 312, a position determination module 314, a dead reckoning position module 316, a data transfer module 318, and a data store 320. Modules 302-318 can implement, for example, crowd sourcing module 108 of FIG. 1. Each module 302-318 can be implemented in software, firmware, hardware, or combinations thereof. Although specific modules are illustrated in FIG. 3, it should be noted that additional modules can be included in device 300 and/or some modules (e.g., backtracking module 312) illustrated need not be included in device 300. Additionally, it should be noted that the functionality of multiple modules illustrated in FIG. 3 can be combined into a single module, and/or the functionality of one or more modules illustrated in FIG. 3 can be separated into multiple modules.

GNSS module 302 implements GNSS functionality for device 300, determining a position of device 300 based on one or more satellites from which GNSS module 302 can receive signals or otherwise communicate. This determined position is typically latitude and longitude coordinates, although the position can alternatively be specified in other manners. GNSS module 302 can implement the GNSS functionality using a variety of different technologies, such as the Global Positioning System (GPS), the Global Navigation Satellite System (GLONASS), the BeiDou (or Compass) navigation system, the Galileo positioning system, combinations thereof, and so forth.

GNSS module 302 provides or otherwise makes available the determined position of device 300 to various other modules of device 300. GNSS module 302 can also provide or otherwise make available an indication of an estimate of the accuracy of the position of device 300 determined by GNSS module 302. For example, GNSS module 302 can indicate that a particular determined position of device 300 is estimated to be accurate to within a particular distance (e.g., 3 meters or 8 meters). By way of another example, GNSS module 302 can indicate that a particular position of device 300 was determined based on signals received from a particular number of satellites (e.g., 3 satellites or 7 satellites), can indicate the strength of signals received by module 302 from satellites, and so forth. Based on such an indication, another module of device 300 can determine an estimated accuracy of the determined position (e.g., estimated to be accurate within 40 meters if signals are received from 3 satellites, and within 8 meters if signals are received from 7 satellites).

GNSS module 302 can determine the position of device 300 at regular or irregular intervals. GNSS module 302 can also determine the position of device 300 in response to various events, such as a request from another module of device 300. In one or more embodiments, GNSS module 302 can also be deactivated or powered down at various times (e.g., to conserve energy), and not determine the position of device 300 until module 302 is activated or powered on. GNSS module 302 can be configured to deactivate or power down itself in response to certain conditions (e.g., receiving signals from fewer than a threshold number of satellites for a threshold amount of time), and/or in response to a deactivate or power down signal from another module of device 300. GNSS module 302 can be activated or powered on in response to a signal from another module of device 300 and/or in response to certain conditions (e.g., being deactivated or powered down for a threshold amount of time).

Wi-Fi module 304 implements wireless functionality for device 300, sending signals to and/or receiving signals from devices on various wireless networks. Wi-Fi module 304 can receive signals from various wireless access points, including an identifier of a particular wireless access point and/or a particular wireless network from which a signal is received. For example, a wireless access point may send a media access control (MAC) address of the wireless access point, a basic service set identifier (BSSID) of a wireless network supported by the wireless access point, and so forth. Wi-Fi module 304 also measures a strength (e.g., received signal strength indicator (RSSI) values) of these received radio signals. It should be noted that Wi-Fi module 304 can, at any given time for any given position of device 300, receive signals from multiple wireless access points. Wi-Fi module 304 provides or otherwise makes available an indication of the identifiers of the particular wireless access points and/or wireless networks from which signals are received, as well as the strengths of those signals, to various other modules of device 300.

Wi-Fi module 304 can detect particular wireless access points and/or wireless networks from which signals are received, and the strength of those signals, at regular or irregular intervals. Wi-Fi module 304 can also detect particular wireless access points and/or wireless networks from which signals are received, and the strength of those signals, in response to various events, such as a request from another module of device 300.

Communications module 306 implements cell phone functionality for device 300, sending signals to and/or receiving signals from various cell transceivers (e.g., cell towers). Communications module 306 can receive signals from various cell transceivers, including an identifier of a particular cell transceiver (e.g., a cell tower or transceiver identifier) from which a signal is received. Communications module 306 also measures a strength (e.g., RSSI values) of these received signals. It should be noted that communications module 306 can, at any given time for any given position of device 300, receive signals from multiple cell transceivers. Communications module 306 provides or otherwise makes available an indication of the identifiers of the particular cell transceivers from which signals are received, as well as the strengths of those signals, to various other modules of device 300.

Communications module 306 can detect particular cell transceivers from which signals are received, and the strength of those signals, at regular or irregular intervals. Communications module 306 can also detect particular cell transceivers from which signals are received, and the strength of those signals, in response to various events, such as a request from another module of device 300.

Inertial sensor module 308 includes one or more inertial sensors that detect movement (e.g., rotation, motion, velocity, etc.), position, or direction. These inertial sensors can be MEMS (Microelectromechanical Systems or Microelectronicmechanical systems). These inertial sensors can include, for example, an accelerometer, a compass, a gyroscope, a baroaltimeter, and so forth. Inertial sensor module 308 collects data regarding the detected movement, position, and/or direction of device 300 from these inertial sensors, and provides or otherwise makes available this collected data to other modules of device 300. This data can be used to determine a position of device 300 using dead reckoning, as discussed in more detail below.

It should also be noted that although inertial sensor module 308 is illustrated as being part of device 300, one or more inertial sensors can be implemented as a separate component or device that is coupled to device 300. For example, inertial sensors can be implemented as part of a watch worn by a user, as part of a device attached to a user's shoe, as part of a heart rate monitor component, and so forth.

Inertial sensor module 308 can collect data at regular or irregular intervals. Inertial sensor module 308 can also collect data in response to various events, such as a request from another module of device 300. In one or more embodiments, inertial sensor module 308 (including the inertial sensors) can also be deactivated or powered down at various times (e.g., to conserve energy), and not provide or collect data until module 308 is activated or powered on. Inertial sensor module 308 can be configured to deactivate or power down itself in response to certain conditions (e.g., after a threshold amount of time), and/or in response to a deactivate or power down signal from another module of device 300. Inertial sensor module 308 (including the inertial sensors) can be activated or powered on in response to a signal from another module of device 300 and/or in response to certain conditions (e.g., being deactivated or powered down for a threshold amount of time).

Dead reckoning position module 316 determines the position of device 300 based on data collected by inertial sensor module 308. Dead reckoning refers to determining a position of device 300 based on the movement of device 300 (e.g., as opposed to receiving one or more signals indicating the position of device 300). In device 300, the movement of device 300 is indicated by the data collected from the inertial sensors as discussed above. The dead reckoning is performed based on a known starting position (e.g., a position determined by GNSS module 302, a position identified by a beacon as discussed below, a position specified by a user of device 300 (e.g., by providing a user input of the position on a map), etc.). Dead reckoning position module 316 analyzes the data collected from the inertial sensors using a variety of different conventional and/or proprietary algorithms, rules, or criteria to determine, based on the known starting position and movement of device 300, the position of device 300 at a particular time.

The position of device 300 determined based on the inertial sensors is subject to a particular error over time and/or movement, referred to as drift. This error typically accumulates over time and/or movement, increasing as time elapses and/or the distance moved increases. Dead reckoning position module 316 can determine an estimate of the accuracy of the position of device 300 determined based on the data from inertial sensor module 308. Various conventional and/or proprietary algorithms, rules, or criteria can be used to determine the estimated error. For example, dead reckoning position module 316 can determine that, after movement of a threshold distance is detected, the estimated error in the determined position of device 300 is a particular number of meters (e.g., the estimated error may be 3 meters after walking 400 meters).

Position determination module 314 implements functionality to determine the position of device 300. This position is typically latitude and longitude coordinates, although the position can alternatively be specified in other manners. Position determination module 314 can determine the position of device 300 to be the position determined by GNSS module 302 as discussed above, or the position determined by dead reckoning position module 316 as discussed above. Position determination module 314 automatically determines whether the position of device 300 at any given time is the position determined by GNSS module 302 or the position determined by dead reckoning position module 316 based on various factors, as discussed in more detail below. It should be noted that position determination module 314 automatically determines whether to use the position determined by module 302 or the position determined by module 316—no action on the part of a user of device 300 need be performed to switch between modes or otherwise select one of modules 302 or 316 to provide the position for position determination module 314.

Data collection module 310 implements functionality to record data identifying signals that device 300 receives and a corresponding position of device 300 at various points in time. Wi-Fi module 304 provides or otherwise makes available an indication of the identifiers of the particular wireless access point and/or wireless network from which signals are received, as well as the strengths of those signals, as discussed above. Communications module 306 provides or otherwise makes available an indication of the identifiers of the particular cell transceivers from which signals are received, as well as the strengths of those signals, as discussed above. The indication of the identifiers of the particular wireless access point and/or wireless network from which signals are received at a particular point in time (as well as the strengths of those signals) and/or the indication of the identifiers of the particular cell transceivers from which signals are received at that particular point in time (as well as the strengths of those signals) is also referred to as observation data at that particular point in time. Data collection module 310 records, in data store 320, the observation data at that particular point in time. A position of device 300 (as determined by position determination module 314) at that particular point in time is also recorded in data store 320 and corresponds to the observation data.

Data collection module 310 stores a record including the observation data and corresponding position of device 300 at different points in time. These different points in time can be at regular intervals, irregular intervals, or can be determined based on other factors or events. However, over time, data collection module 310 stores multiple such records in data store 320.

Data transfer module 318 sends the recorded observation data and corresponding positions to a data service (e.g., crowd sourcing data service 104 of FIG. 1). Data transfer module 318 can send the recorded observation data and corresponding positions to the data service at regular or irregular intervals, or alternatively in response to other events (e.g., device 300 being connected to or logged into a particular network).

Position determination module 314 can determine the position of device 300 using GNSS module 302 and/or dead reckoning position module 316. Each module 302 and 316 has an estimated accuracy for the position of device 300 determined by that module. Position determination module 314 can determine the estimated accuracy for the position of device 300 from module 302 and/or module 316 as the estimated accuracy provided by module 302 and/or module 316, and/or determine the estimated accuracy for the position of device 300 based on data provided by module 302 and/or module 316.

Generally, position determination module 314 determines as the position of device 300 the position determined by GNSS position module 302 until device 300 is detected as being at one of one or more anchor locations. An anchor location indicates to device 300 to get ready to use dead reckoning for position determination, for example because the estimated accuracy of GNSS module 302 may decrease and/or GNSS module 302 may be unable to determine a position of device 300 soon (e.g., within a threshold amount of time, such as within the next few or several seconds). Position determination module 314, in response to determining that device 300 is at an anchor location, activates or powers on inertial sensor module 308 if module 308 is not already activated or powered on. Module 314 determines the estimated accuracy of the position of device 300 as determined by module 302 and the estimated accuracy of the position of device 300 as determined by module 316, and determines as the position of device 300 the one of the two determined positions (from module 302 or 316) that is more accurate (e.g., is estimated to be accurate within a smaller amount). For example, if one determined position is estimated to be accurate within 8 meters and the other position is estimated to be accurate within 40 meters, the position estimated to be accurate within 8 meters is the more accurate of the two positions It should be noted that inertial sensor module 308 (including the inertial sensors) can be typically deactivated or powered down, and then activated or powered on when device 300 is detected as being at an anchor location. When deactivated or powered down, inertial sensors included in module 308 consume very little if any energy. Thus, by keeping inertial sensor module 308 deactivated or powered down until at an anchor location (and using as the position of device 300 the position determined by GNSS module 302), the energy usage of device 300 can be reduced. However, inertial sensor module 308 can then be activated or powered on to provide data used to determine the position of device 300 when the estimated accuracy of GNSS module 302 may decrease and/or GNSS module 302 may be unable to determine a position of device 300 soon.

The anchor locations can be specified in various manners. In one or more embodiments, the anchor locations are locations along the edge or perimeter of a dead zone, these locations being referred to as a proximity zone. A dead zone as used herein refers to an area in which GNSS module 302 cannot provide a position deemed to be accurate enough. For example, a dead zone can be an area in which the estimated accuracy of the position determined by GNSS module 302 is below a threshold amount, an area in which GNSS module 302 is unable to determine a position, an area in which signals are received from less than a threshold number of satellites, combinations thereof, and so forth.

The proximity zone can be defined in various manners. In one or more embodiments, position determination module 314 has access to a mapping of (e.g., latitude and longitude coordinates of) dead zones. The proximity zones can be determined based on the dead zones in a variety of different manners. In one or more embodiments, the proximity zones are specified as a particular distance or buffer space extending away from the edge of the dead zone. For example, the proximity zones can be the area that is a 5-meter buffer along the edge of the dead zone. The particular distance or buffer space can be based on various factors, such as the amount of time inertial sensor module 308 takes to provide accurate data after being activated or powered on, an expected speed of device 300, and so forth.

Alternatively, the proximity zones can be specified as a particular distance or buffer space extending away from the edge of the dead zone within a particular distance of an entrance to the dead zone. For example, the proximity zone can be the area that is both a 5-meter buffer along the edge of the dead zone and within 5 meters of an entrance to the dead zone (e.g., within two meters of a door to a building that is a dead zone).

The proximity zones can be fixed, such as a 5-meter buffer along the edge of the dead zone. Alternatively, the proximity zones can be variable, changing based on the speed of device 300. Position determination module 314 can readily determine the speed of device 300 based on determined positions of device 300 (e.g., by GNSS module 302) and the time between those determinations. The proximity zone can increase as the speed of device 300 increases, and decrease as the speed of device 300 decreases. For example, the proximity zone when device 300 is being held by a user that is running may be a 10-meter buffer along the edge of the dead zone, and the proximity zone when device 300 is being held by a user that is walking slowly may be a 3-meter buffer along the edge of the dead zone.

Given the proximity zones, position determination module 314 can readily determine when device 300 is in a proximity zone based on the position of device 300 as determined by GNSS module 302. The mapping of proximity zones can be obtained in different manners, such as from data store 320 or other store of device 300, from a device or service external to device 300, and so forth.

Figure 4:
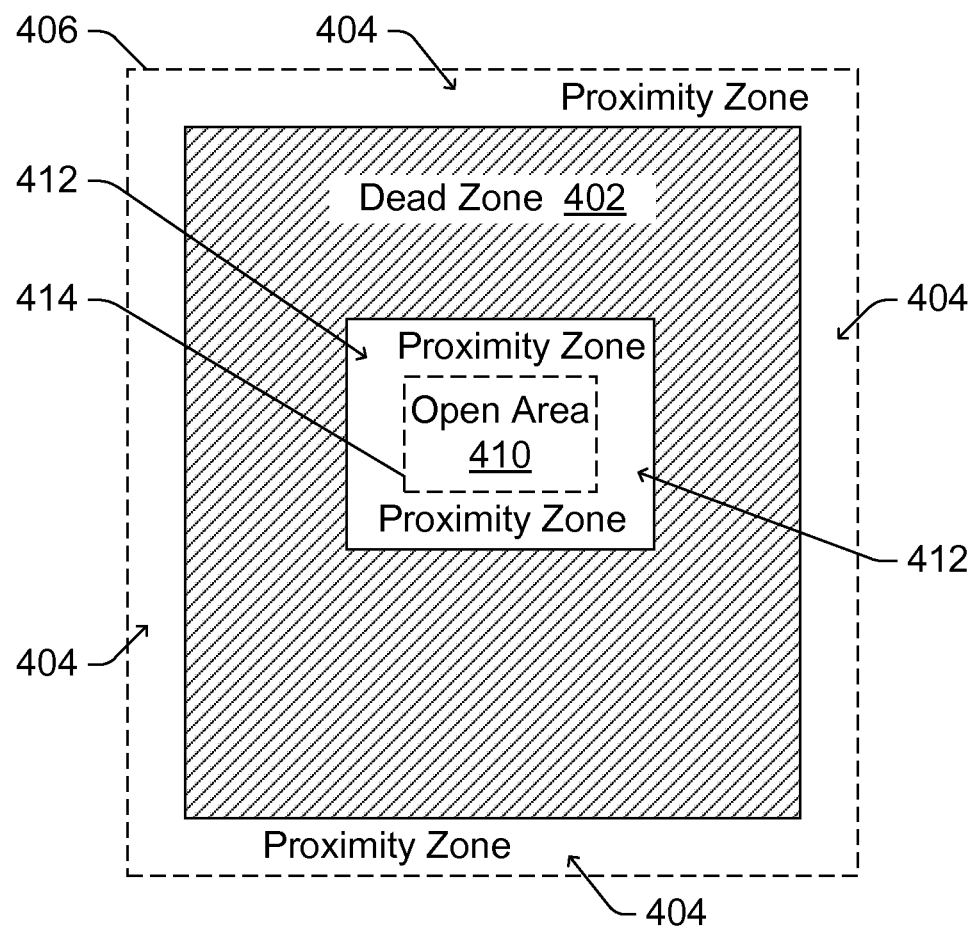
FIG. 4 illustrates an example proximity zone in accordance with one or more embodiments.

FIG. 4 illustrates an example proximity zone in accordance with one or more embodiments. A dead zone 402 is illustrated in FIG. 4 as the area with cross-hatching. A proximity zone 404 surrounding dead zone 402 is shown as the area between dead zone 402 and dashed line 406. Additionally, an open area 410 is illustrated that is excluded from, but surrounded by, dead zone 402. In open area 410, the estimated accuracy of the position determined by GNSS module 302 is not below a threshold amount, and thus open area 410 is not included in dead zone 402. Open area 410 could be, for example, an area below skylights in a building, or an outdoor courtyard surrounded by a building. A proximity zone 412 around the edge of dead zone 402 (the edge between dead zone 402 and open area 410) is shown as the area between dead zone 402 and dashed line 414.

Returning to FIG. 3, anchor locations can alternatively be specified in other manners. For example, the anchor locations can be locations specified by a user of device 300 (e.g., by providing a user input of the location on a map), etc.). By way of another example, the anchor locations can be locations where a signal from a beacon is detected. Beacons can be implemented in a variety of different manners, such as Bluetooth transmitters, Bluetooth Low Energy (BLE) transmitters, radio frequency transmitters, Near Field Communication (NFC) transmitters, and so forth. Each such beacon can transmit a signal that is detected by position determination module 314, and can include an indication that the beacon is a beacon for an anchor location and/or an indication of the position of the beacon. The position of the beacon can be transmitted in different manners, such as being transmitted as latitude and longitude coordinates, being transmitted as an identifier that can be looked up in a table accessible to module 314 to determine a corresponding position of the beacon, and so forth. Beacons are typically located at the edge or perimeter of a dead zone (e.g., within or near (within a threshold distance of) a dead zone) where a user can move between the dead zone and a non-dead zone, and optionally can be located elsewhere (e.g., within a dead zone).

Figure 5:
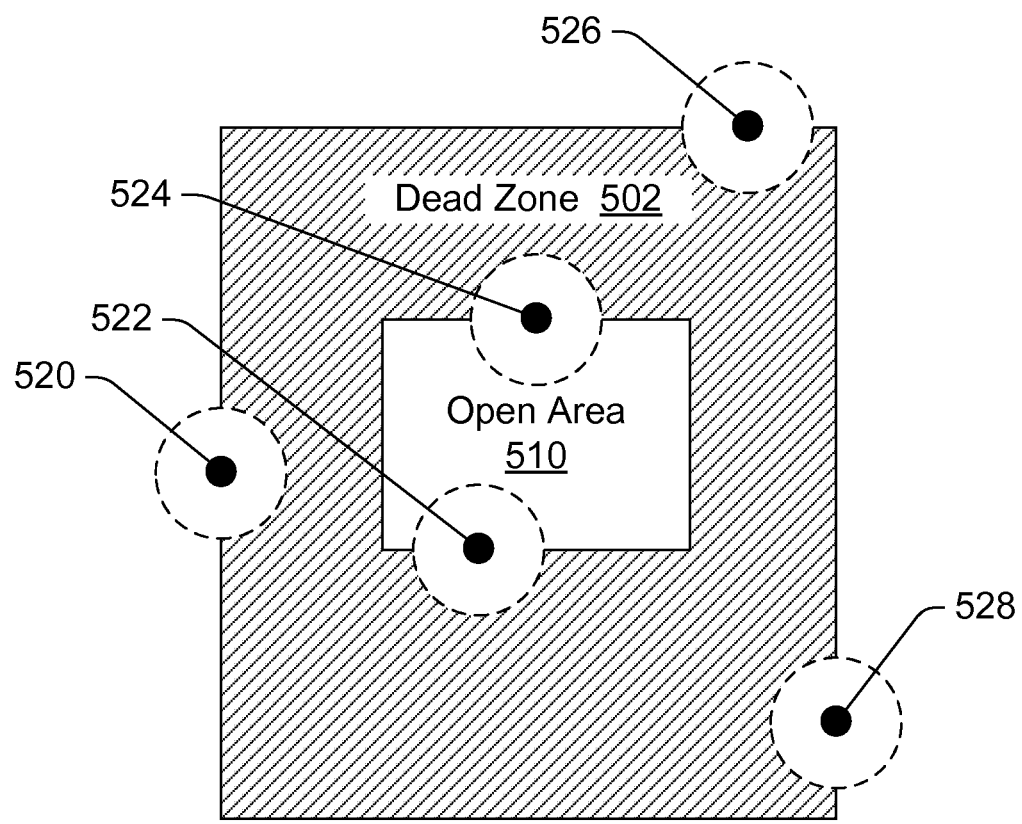
FIG. 5 illustrates an example use of anchored beacons in accordance with one or more embodiments.

FIG. 5 illustrates an example use of anchored beacons in accordance with one or more embodiments. A dead zone 502 is illustrated in FIG. 5 as the area with cross-hatching, analogous to dead zone 402 of FIG. 4. Additionally, an open area 510 is illustrated that is excluded from, but surrounded by, dead zone 502, analogous to open area 410 of FIG. 4. Multiple beacons 520, 522, 524, 526, and 528 are illustrated. Each beacon 520-528 transmits a signal for a particular radius around the beacon (e.g., a 3-meter radius). Although the beacons 520-528 are illustrated as transmitting signals having the same radius, it should be noted that the radius of signals transmitted by different beacons can be different. Additionally, although the beacons 520-528 are illustrates as transmitting a signal with a constant radius in all directions from the beacons, the transmitted signal from a beacon can have a different radius in different directions. For example, a beacon may be mounted to a wall and transmit a signal with a 3-meter radius in a direction away from the wall, and a 1-meter radius in a direction towards the wall.

Returning to FIG. 3, position determination module 314 determines the position of device 300 using GNSS module 302 and/or dead reckoning position module 316 while the estimated accuracy of the position determined by at least one of module 302 and module 316 remains acceptable. Whether the estimated accuracy of the position determined by at least one of module 302 and module 316 is acceptable can be determined in different manners, such as based on a particular estimated accuracy that position determination module 314 is configured to use. Module 314 can be configured with this particular estimated accuracy in different manners, such as being pre-configured in module 314, being set by a user of device 300, being obtained from another source, and so forth. If the estimated accuracy of the position determined by at least one of module 302 and module 316 satisfies (e.g., is less than or equal to) the particular estimated accuracy, then the estimated accuracy of the position determined by at least one of module 302 and 316 is acceptable. However, if the estimated accuracy of the position determined by at least one of module 302 and module 316 does not satisfy (e.g., is not less than or equal to) the particular estimated accuracy, then the estimated accuracy of the position determined by at least one of module 302 and 316 is not acceptable.

Typically, as device 300 is moved into a dead zone, dead reckoning position module 316 determines a position of device 300 with a better (more accurate) estimated accuracy than GNSS module 302 determines for device 300. When comparing estimated accuracies, smaller values are typically better estimated accuracies (e.g., an estimate of being accurate within 3 meters is better than an estimate of being accurate within 8 meters), although depending on the manner in which estimated accuracies are specified larger or other values can be better estimated accuracies. Thus, as device 300 is moved into a dead zone, position determination module 314 typically determines as the position of device 300 the position determined by dead reckoning position module 316 until the module 316 no longer provides an acceptable estimated accuracy (e.g., due to drift as discussed above). This duration for which dead reckoning position module 316 provides an acceptable estimated accuracy is also referred to as a dead reckoning fidelity interval.

It should also be noted that beacons can optionally be placed at various positions within a dead zone. A variety of different types of beacons can be used, analogous to the discussion above regarding anchor locations. Position determination module 314 can identify these beacons and dead reckoning position module 316 can use the position identified by such a beacon as the known starting position of device 300 for dead reckoning. For example, the inertial sensors can be reset (e.g., turned off and back on) to use the position identified by the beacon as the known starting position of device 300. Dead reckoning position module 316 can then continue to determine, based on data from inertial sensor module 308, the position of device 300 from the position identified by the beacon (analogous to module 302 determining the position of device 300 from an anchor location). The dead reckoning fidelity interval can thus effectively be extended each time such a beacon is encountered.

Situations can arise in which neither GNSS module 302 nor dead reckoning position module 316 determine a position of device 300 with an acceptable estimated accuracy. In such situations, data collection module 310 can optionally stop recording the observation data and the corresponding position of device 300. If at a later time at least one of GNSS module 302 and dead reckoning position module 316 determines a position of device 300 with an acceptable estimated accuracy, data collection module 310 resumes recording the observation data and the corresponding position of device 300.

Alternatively, data collection module 310 can continue to record the observation data and the corresponding position of device 300 as determined by dead reckoning position module 316. This recorded observation data and corresponding position can be stored or marked in data store 320 in a manner to indicate that the recorded observation data and corresponding position is based on a determined position of device 300 that does not have an acceptable estimated accuracy. In one or more embodiments, data transfer module 318 does not send to a data service the recorded observation data and corresponding position based on a position of device 300 that does not have an acceptable estimated accuracy.

Subsequently, when a position of device 300 is determined that does have an acceptable estimated accuracy, backtracking module 312 compares that position with the acceptable estimated accuracy to the recorded positions, and modifies at least some of the recorded positions. The position of device 300 that does have an acceptable estimated accuracy can be obtained in various manners, such as from a beacon at the edge of a dead zone or within a dead zone, from GNSS module 302, and so forth. The modified recorded positions and corresponding observation data can subsequently be stored or marked to no longer indicate they are based on a determined position of device 300 that does not have an acceptable estimated accuracy, and thus can be sent to a data service by data transfer module 318.

Alternatively, rather than recording the observation data and corresponding position of device 300, data collection module 310 can record the data collected by inertial sensor module 308 when neither GNSS module 302 nor dead reckoning position module 316 determine a position of device 300 with an acceptable estimated accuracy. Subsequently, when a position of device 300 can be determined that does have an acceptable estimated accuracy, backtracking module 312 can use the recorded data from inertial sensor module 308 to perform the backtracking. Thus, when neither GNSS module 302 nor dead reckoning position module 316 can determine a position of device 300 with an acceptable estimated accuracy, a position of device 300 need not be determined until a position with an acceptable estimated accuracy can be determined.

In one or more embodiments, backtracking module 312 backtracks from the position that does have an acceptable estimated accuracy for the dead reckoning fidelity interval. In one or more embodiments, backtracking module 312 performs backtracking by starting at the position that has an acceptable estimated accuracy. Module 312 then works backwards through the inertial sensor data collected by inertial sensor module 308 and recorded in data store 320 that leads up to that position, providing the inertial sensor data recorded in data store 320 (starting at the position that has the acceptable estimated accuracy, so the data is provided in the opposite order in which it was collected by inertial sensor module 308) to dead reckoning position module 316. Module 316 determines a position of device 300 based on the inertial sensor data provided by backtracking module 312 as discussed above. Module 312 thus effectively treats the device as moving backwards (e.g., until the determined position of device 300 does not have an acceptable estimated accuracy) based on the collected inertial sensor data.

Backtracking module 312 can perform the backtracking using a variety of different conventional and/or proprietary algorithms, rules, criteria, and so forth. For example, backtracking module 312 can modify the positions for the dead reckoning fidelity interval to follow approximately the same path shape as was recorded by data collection module 310, except backtracking starting at the position that has the acceptable estimated accuracy rather than the recorded position.

Figure 6:
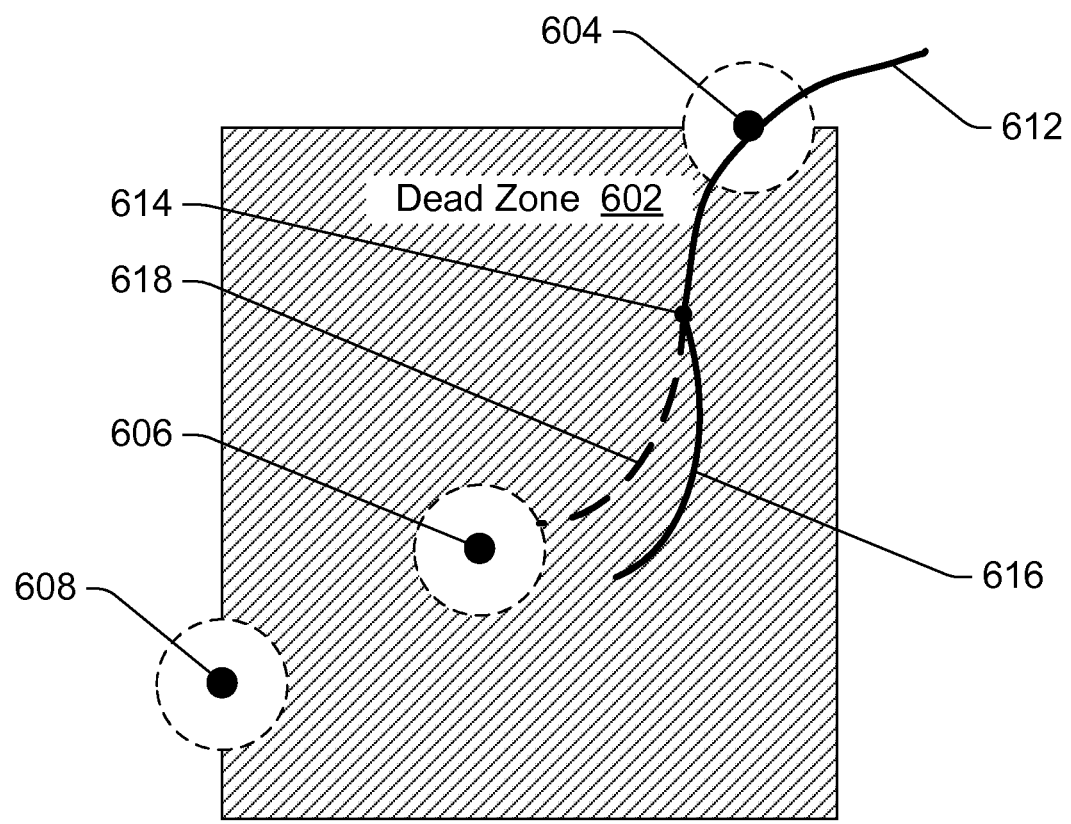
FIG. 6 illustrates an example use of backtracking in accordance with one or more embodiments.

FIG. 6 illustrates an example use of backtracking in accordance with one or more embodiments. A dead zone 602 is illustrated in FIG. 6, analogous to dead zone 502 of FIG. 5 or dead zone 402 of FIG. 4, although without an open area analogous to open area 510 of FIG. 5 or open area 410 of FIG. 4. Multiple beacons 604, 606, and 608 are illustrated, analogous to beacons 520-528 of FIG. 5.

A path 612 is included in FIG. 6, illustrating a path of a device as the device enters dead zone 602. Dead reckoning (e.g., dead reckoning position module 316 of FIG. 3) is used to determine positions of the device for a dead reckoning fidelity interval, which lasts until a point 614. At point 614, the position determined by dead reckoning no longer has an acceptable estimated accuracy. However, dead reckoning continues to be performed, identifying positions indicating a path 616. Positions and corresponding observation data continue to be recorded along path 616. In response to receiving a signal from beacon 606, a module of the device (e.g., position determination module 314 of FIG. 3) detects that the position of the device as determined based on the signal from beacon 606 is not the same position as the position determined by dead reckoning (along path 616). Accordingly, a backtracking module (e.g., module 312 of FIG. 3) modifies the recorded positions to reflect a path 618 rather than path 616. These positions along paths 612 and 618, and corresponding observation data can be sent to a data service (e.g., by data transfer module 318 of FIG. 3).

Alternatively, rather than recording positions and corresponding observation data along path 616, observation data that would result in positions indicating path 616 is recorded (corresponding positions need not be identified). In response to receiving a signal from beacon 606 (which provides a position with an acceptable estimated accuracy), a backtracking module (e.g., module 312 of FIG. 3) works backwards through the recorded observation data to identify the path 618.

Returning to FIG. 3, in one or more embodiments inertial sensor module 308 is deactivated or powered down (e.g., in response to a signal from position determination module 314) when device 300 is not within a dead zone. Inertial sensor module 308 is then activated or powered on in response to device 300 being detected as being at one of one or more anchor locations. Inertial sensor module 308 can remain activated or powered on until device 300 is no longer detected as being within the dead zone or at an anchor location, at which time inertial sensor module 308 is deactivated or powered down. When device 300 is no longer within a dead zone can be detected in different manners, such as based on whether GNSS module 302 provides a position of device 300 that has an acceptable estimated accuracy, in response to detecting another anchor location while in or having just been in a dead zone (e.g., an anchor location that indicates device 300 is leaving the dead zone), and so forth. Positions of device 300 are then determined as the position detected by GNSS module 302 as discussed above. A delay time (e.g., a particular number of seconds or minutes) can optionally be implemented so that inertial sensor module 308 is not deactivated or powered down until a threshold amount of time (the delay amount of time) has elapsed after device 300 is no longer detected as being within the dead zone or at an anchor location (and device 300 is still detected as not being within the dead zone or at an anchor location when the threshold amount of time elapses). Various other factors can also be used to determine when to deactivate or power down inertial sensor module 308, such as whether GNSS module 302 provides a position of device 300 that has an acceptable estimated accuracy.

Alternatively, inertial sensor module 308 can be deactivated or powered down after the dead reckoning fidelity interval has elapsed. Inertial sensor module 308 can optionally be again powered on or activated in response to different events, such as receiving a signal received from a beacon, detecting that the device is again at an anchor location, and so forth.

In one or more embodiments, GNSS module 302 is deactivated or powered down (e.g., in response to a signal from position determination module 314) when device 300 is within a dead zone. GNSS module 302 can then be activated or powered on (e.g., in response to a signal from position determination module 314) when device 300 is no longer within the dead zone (e.g., as determined by the position of device 300 using dead reckoning, as determined by detecting device 300 is at one of one or more anchor locations, and so forth). Alternatively, rather than being deactivated or powered down, GNSS module 302 can be configured (e.g., in response to a signal from position determination module 314) to determine the position of device 300 at larger intervals when device 300 is within a dead zone than when device 300 is not within a dead zone. For example, position determination module 314 can indicate to GNSS module 302 to determine the position of device 300 every 1 second when device 300 is not within a dead zone, and every 10 seconds when device 300 is within a dead zone.

Figure 7:
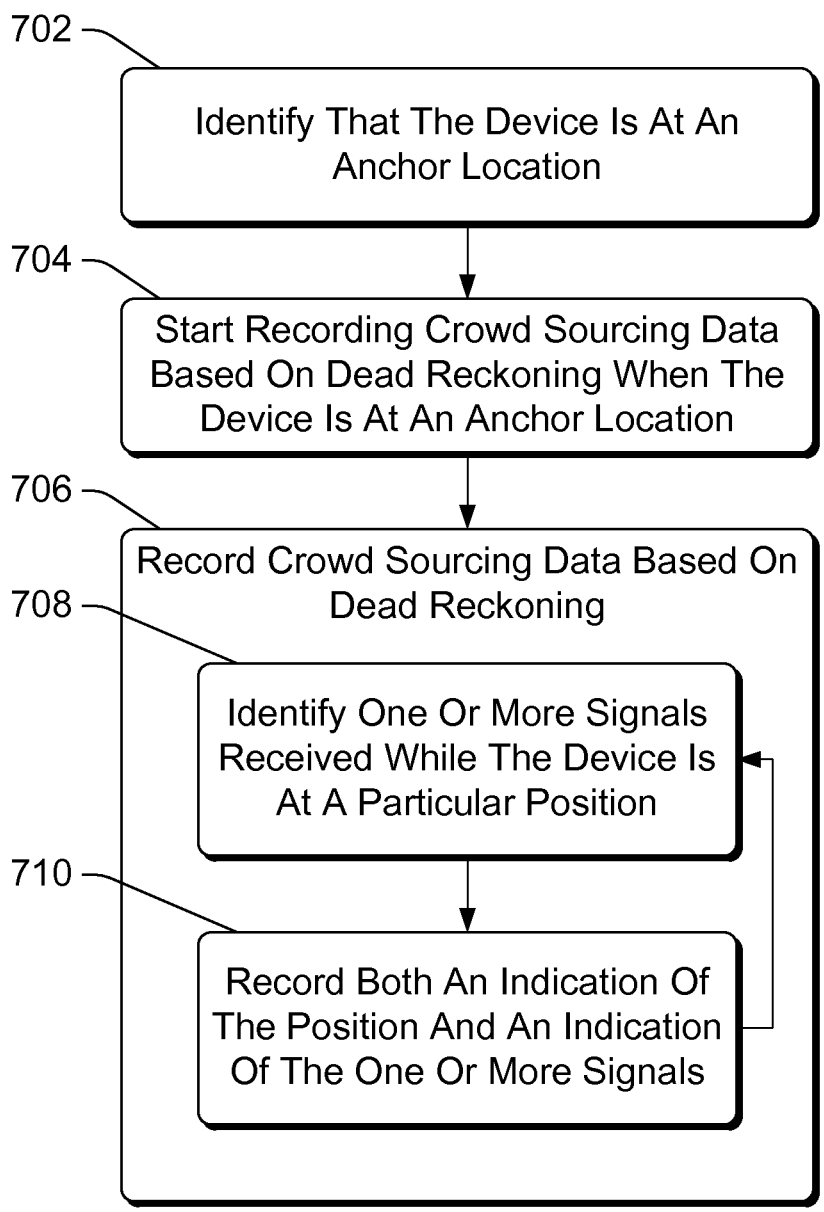
FIG. 7 is a flowchart illustrating an example process for crowd sourcing based on dead reckoning in accordance with one or more embodiments.

FIG. 7 is a flowchart illustrating an example process 700 for crowd sourcing based on dead reckoning in accordance with one or more embodiments. Process 700 is carried out by a device, such as device 102 of FIG. 1 or device 300 of FIG. 3, and can be implemented in software, firmware, hardware, or combinations thereof. Process 700 is shown as a set of acts and is not limited to the order shown for performing the operations of the various acts. Process 700 is an example process for crowd sourcing based on dead reckoning; additional discussions of crowd sourcing based on dead reckoning are included herein with reference to different figures.

In process 700, the device is identified as being at an anchor location (act 702). An anchor location can be identified in different manners, such as a location within a proximity zone along an edge of a dead zone or a location where a signal from a beacon is detected as discussed above.

Recording crowd sourcing data based on dead reckoning starts in response to the device being at the anchor location (act 704). The starting of recording crowd sourcing data can include powering on or activating one or more inertial sensors from which data is collected for dead reckoning.

Crowd sourcing data based on dead reckoning is recorded (act 706). This data is recorded by the device implementing process 700 and can be sent to a crowd sourcing data service at a subsequent time, as discussed above.

Recording crowd sourcing data based on dead reckoning includes identifying one or more signal received at the device implementing process 700 while the device is at a particular position (act 708), and recording both an indication of the position and an indication of the one or more signals received while the device is at that position (act 710). The signals received can be Wi-Fi and/or cell transceiver signals as discussed above, and the indication of the one or more signals can include an identifier of a network, access point, or transceiver, as well as strengths of received signals, as discussed above. The position is determined using dead reckoning, as discussed above. Acts 708 and 710 are repeated for each of multiple different positions.

Figure 8:
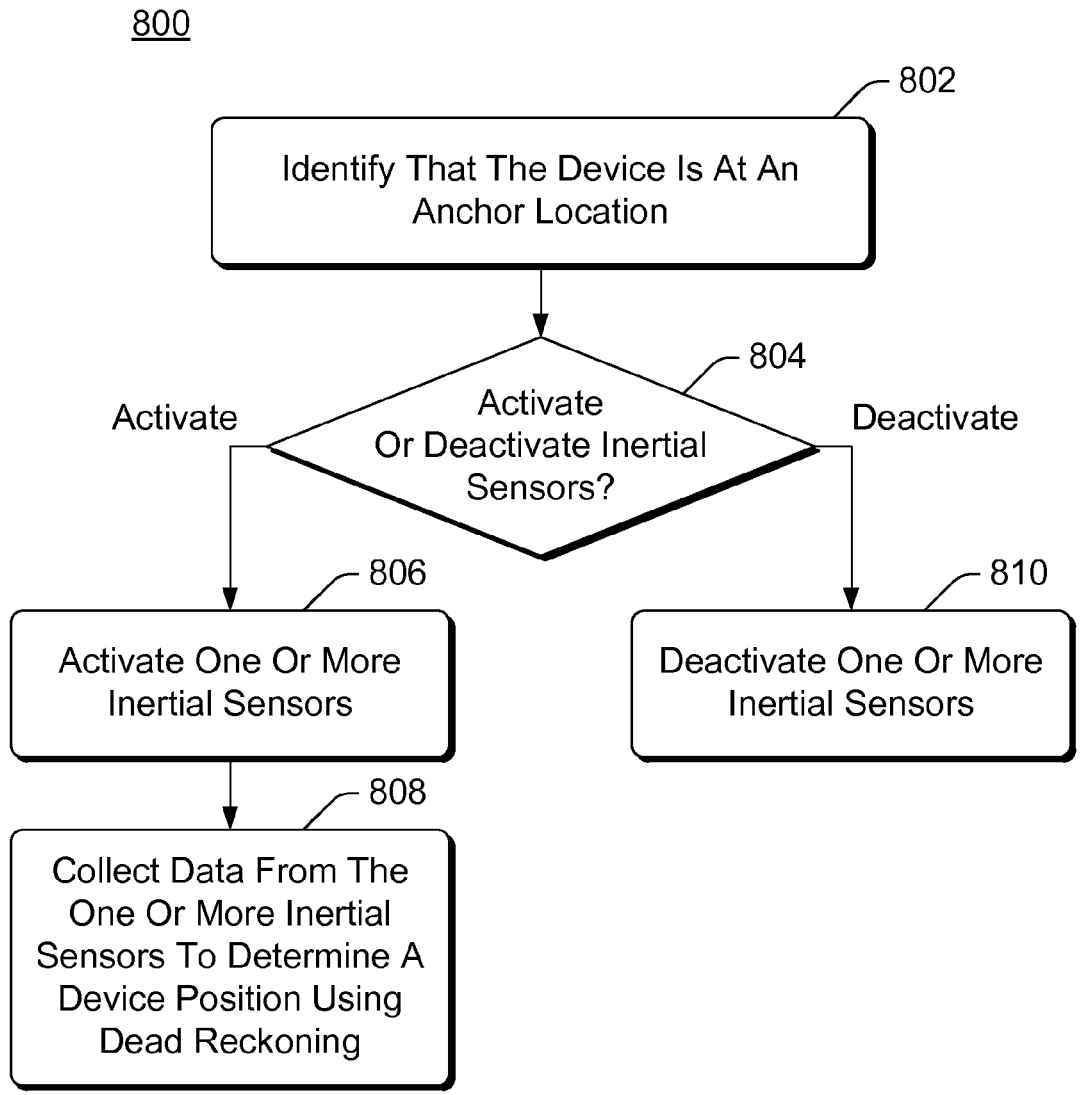
FIG. 8 is a flowchart illustrating an example process for activating and deactivating inertial sensors for dead reckoning in accordance with one or more embodiments.

FIG. 8 is a flowchart illustrating an example process 800 for activating and deactivating inertial sensors for dead reckoning in accordance with one or more embodiments. Process 800 is carried out by a device, such as device 102 of FIG. 1 or device 300 of FIG. 3, and can be implemented in software, firmware, hardware, or combinations thereof. Process 800 is shown as a set of acts and is not limited to the order shown for performing the operations of the various acts. Process 800 is an example process for activating and deactivating inertial sensors for dead reckoning; additional discussions of activating and deactivating inertial sensors for dead reckoning are included herein with reference to different figures.

In process 800, the device is identified as being at an anchor location (act 802). An anchor location can be identified in different manners, such as a location within a proximity zone along an edge of a dead zone or a location where a signal from a beacon is detected as discussed above.

A determination is made, based at least in part on the device being at the anchor location, whether and/or when to activate and/or deactivate one or more inertial sensors (act 804). This determination can be based on various factors, such as whether the inertial sensors are already activated or deactivated, whether the device has moved away from an anchor location for which a determination in act 804 has been made, how long the inertial sensors have been activated, and so forth. For example, the determination can be made in act 804 to activate one or more inertial sensors if the inertial sensors are currently deactivated and the device is identified as being at the anchor location. By way of another example, the determination can be made in act 804 to deactivate one or more inertial sensors a particular amount of time (e.g., a dead reckoning fidelity interval) after the device is identified as being at the anchor location. By way of yet another example, the determination can be made in act 804 to deactivate one or more inertial sensors if the inertial sensors are currently activated and the device is identified as being at the anchor location.

In response to a determination being made to activate the inertial sensors, one or more inertial sensors are activated (act 806). Data is collected from the one or more inertial sensors and used to determine a device position using dead reckoning (act 808). Both an indication of the determined position and an identification of one or more signals received while the device is at that position can be recorded as discussed above.

In response to a determination being made to deactivate the inertial sensors, one or more inertial sensors are deactivated (act 810). The inertial sensors can be deactivated shortly after the determination is made in act 804 (e.g., within 1 second), or alternatively after delay occurs (e.g., a particular amount of time elapses, the device implementing process 800 moves a particular distance, and so forth).

The crowd sourcing based on dead reckoning techniques discussed herein support various usage scenarios. For example, a user can carry a device with him or her and that device can repeatedly record the position of the device and corresponding Wi-Fi and cell transceiver signals (and signal strengths) received at that position. While the user is outside and the device can receive signals from GNSS satellites, a GNSS module of the device is used to determine the position of the device. When the user walks into a dead zone (e.g., near a building, such as a mall) and the device can no longer receive signals from GNSS satellites, the position of the device is determined using dead reckoning. Thus, the user's device is able to record data regarding the positions of the device and corresponding Wi-Fi and cell transceiver signals (and signal strengths) received at those positions within the dead zone, even though signals from GNSS satellites are not received. This recorded data can be provided by the device to a crowd sourcing data service, making information regarding Wi-Fi and cell transceiver signals and signal strengths received at positions at which signals from GNSS satellites are not received available to the crowd sourcing data service. When the user subsequently exits the dead zone (e.g., leaves the building), the device can resume using the GNSS module to determine the position of the device.

By way of another example, a user can carry a device with him or her and that device can repeatedly record the position of the device and corresponding Wi-Fi and cell transceiver signals (and signal strengths) received at that position. While the user is outside and the device can receive signals from GNSS satellites, a GNSS module of the device is used to determine the position of the device and inertial sensors of the device are not activated to conserve energy. When the user walks near a dead zone (e.g., inside a building, such as a mall), the inertial sensors of the device are activated to allow positions of the device to be determined using dead reckoning. If the user walks into the dead zone, the position of the device is determined using dead reckoning. However, if the user walks away from the dead zone, the inertial sensors can be deactivated, and the position of the device continues to be determined by the GNSS module.

Various actions such as communicating, receiving, sending, recording, storing, obtaining, and so forth performed by various modules are discussed herein. A particular module discussed herein as performing an action includes that particular module itself performing the action, or alternatively that particular module invoking or otherwise accessing another component or module that performs the action (or performs the action in conjunction with that particular module). Thus, a particular module performing an action includes that particular module itself performing the action and/or another module invoked or otherwise accessed by that particular module performing the action.

Figure 9:
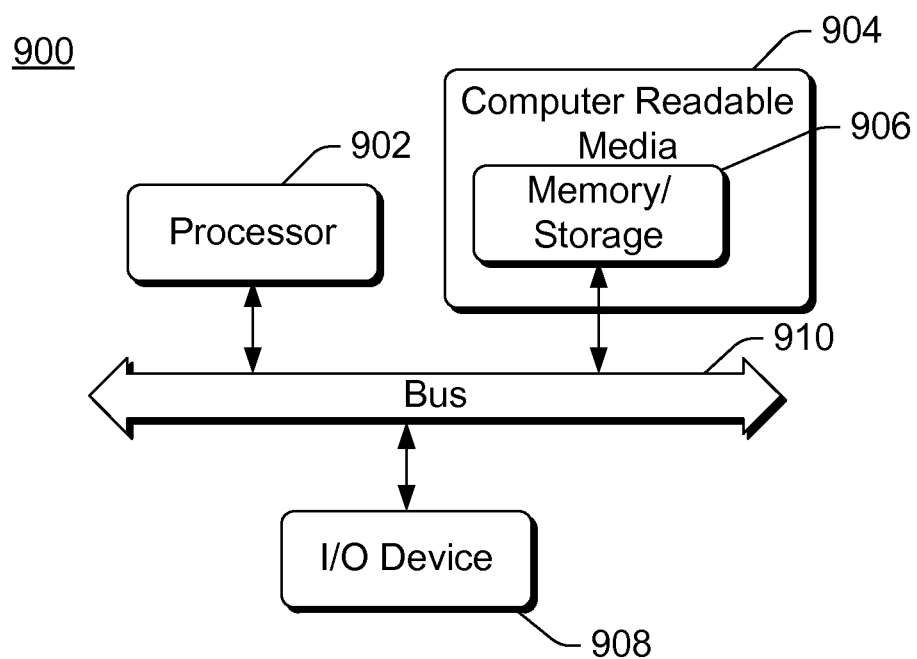
FIG. 9 illustrates an example computing device that can be configured to implement the crowd sourcing based on dead reckoning in accordance with one or more embodiments.

FIG. 9 illustrates an example computing device 900 that can be configured to implement the crowd sourcing based on dead reckoning in accordance with one or more embodiments. Computing device 900 can, for example, be a computing device 102 of FIG. 1, implement at least part of crowd sourcing data service 104 of FIG. 1, be a device 300 of FIG. 3, and so forth.

Computing device 900 includes one or more processors or processing units 902, one or more computer readable media 904 which can include one or more memory and/or storage components 906, one or more input/output (I/O) devices 908, and a bus 910 that allows the various components and devices to communicate with one another. Computer readable media 904 and/or one or more I/O devices 908 can be included as part of, or alternatively may be coupled to, computing device 900. Bus 910 represents one or more of several types of bus structures, including a memory bus or memory controller, a peripheral bus, an accelerated graphics port, a processor or local bus, and so forth using a variety of different bus architectures. Bus 910 can include wired and/or wireless buses.

Memory/storage component 906 represents one or more computer storage media. Component 906 can include volatile media (such as random access memory (RAM)) and/or nonvolatile media (such as read only memory (ROM), Flash memory, optical disks, magnetic disks, and so forth). Component 906 can include fixed media (e.g., RAM, ROM, a fixed hard drive, etc.) as well as removable media (e.g., a Flash memory drive, a removable hard drive, an optical disk, and so forth).

The techniques discussed herein can be implemented in software, with instructions being executed by one or more processing units 902. It is to be appreciated that different instructions can be stored in different components of computing device 900, such as in a processing unit 902, in various cache memories of a processing unit 902, in other cache memories of device 900 (not shown), on other computer readable media, and so forth. Additionally, it is to be appreciated that where instructions are stored in computing device 900 can change over time.

One or more input/output devices 908 allow a user to enter commands and information to computing device 900, and also allow information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, applications, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communication media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer. Computer storage media refer to media for storage of information in contrast to mere signal transmission, carrier waves, or signals per se. Thus, computer storage media refers to non-signal bearing media, and is not communication media.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of communication media.

Generally, any of the functions or techniques described herein can be implemented using software, firmware, hardware (e.g., fixed logic circuitry), manual processing, or a combination of these implementations. The terms "module" and "component" as used herein generally represent software, firmware, hardware, or combinations thereof. In the case of a software implementation, the module or component represents program code that performs specified tasks when executed on a processor (e.g., CPU or CPUs). The program code can be stored in one or more computer readable memory devices, further description of which may be found with reference to FIG. 9. In the case of hardware implementation, the module or component represents a functional block or other hardware that performs specified tasks. For example, in a hardware implementation the module or component can be an application-specific integrated circuit (ASIC), field-programmable gate array (FPGA), complex programmable logic device (CPLD), and so forth. The features of the crowd sourcing based on dead reckoning techniques described herein are platform-independent, meaning that the techniques can be implemented on a variety of commercial computing platforms having a variety of processors.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method implemented by one or more processing units on a device, the method comprising:
   identifying that the device is at an anchor location;
   in response to the device being at the anchor location, starting recording in a data store of the device:
      intermediate device positions determined by dead reckoning,
      observation data received at the intermediate device positions, and
      indications of accuracy of the intermediate device positions;
   sending a first portion of the observation data and first corresponding intermediate device positions to a crowd sourcing data service, wherein the first corresponding intermediate device positions have an acceptable level of accuracy;
   not sending a second portion of the observation data and second corresponding intermediate device positions to the crowd sourcing data service, wherein the second corresponding intermediate device positions do not have the acceptable level of accuracy;
   identifying an updated device position that has the acceptable level of accuracy;
   in response to the identifying the updated device position, using backtracking to modify at least one of the second corresponding intermediate device positions, producing a modified position; and
   sending the modified position and corresponding observation data to the crowd sourcing data service.

2. The method of claim 1, the crowd sourcing data including an identification of one or more signals received while the device is at an individual intermediate device position.

3. The method of claim 1, the anchor location comprising a proximity zone along an edge of a dead zone.

4. The method of claim 1, the anchor location comprising a location where a signal from a beacon is detected.

5. The method of claim 1, further comprising:
   for a subsequent device position following the anchor location, determining whether a first position of the device based on dead reckoning or a second position of the device based on a global navigation satellite system is more accurate.

6. The method of claim 5, further comprising determining and recording an accuracy estimate for the subsequent device position.

7. The method of claim 1, the updated device position being identified based on a signal received from a beacon or a global navigation satellite system.

8. The method of claim 1, the backtracking comprising using data from the dead reckoning to backtrack the at least one of the second corresponding intermediate device positions from the updated device position.

9. The method of claim 8, further comprising recording accuracy estimates that correspond to the intermediate device positions, wherein the backtracking further comprises modifying certain intermediate device positions, determined by the dead reckoning, for which the accuracy estimates do not meet an acceptable estimated accuracy.

10. The method of claim 9, wherein the accuracy estimates are made by the device.

11. The method of claim 1, further comprising using a global navigation satellite system to determine the intermediate device positions at larger intervals while the device is within a dead zone than while the device is not within the dead zone.

12. A device comprising:
a processing unit; and
a storage device storing computer readable instructions which, when executed by the processing unit, cause the processing unit to:
use inertial sensor data to determine different positions of the device in a dead zone by dead reckoning;
record the different positions and associated signals received by the device at the different positions;
continue to collect additional inertial sensor data and additional signals received by the device beyond a dead reckoning fidelity interval;
mark the additional signals as having associated positions that do not have acceptable estimated accuracy;
determine an updated position with acceptable estimated accuracy;
responsive to determining the updated position, backtrack to modify the associated positions to produce modified positions of the device that have acceptable estimated accuracy, wherein the device was at the modified positions prior to arriving at the updated position;
subsequent to modifying the associated positions, re-mark the additional signals as being associated with the modified positions; and
send crowd sourcing data to a crowd sourcing data service, the crowd sourcing data indicating that the additional signals correspond to the modified positions.

13. The device of claim 12, the backtracking being based on the additional inertial sensor data.

14. The device of claim 12, wherein the computer readable instructions further cause the processing unit to:
subsequent to determining the updated position:
determine a first estimated position of the device based on dead reckoning;
determine a second estimated position of the device using a global navigation satellite system; and
select the first estimated position or the second estimated position based on which is a more accurate position of the device.

15. The device of claim 12, the dead reckoning using a known starting position obtained before the device entered the dead zone.

16. The device of claim 12, wherein the computer readable instructions further cause the processing unit to:
determine the updated position using beacon signals from a beacon in or near the dead zone.

17. The device of claim 12, wherein the computer readable instructions further cause the processing unit to:
record the associated positions and associate the associated positions with the additional signals.

18. The device of claim 12, wherein the computer readable instructions further cause the processing unit to:
record strengths of the associated signals received by the device; and
send the strengths as part of the crowd sourcing data to the crowd sourcing data service.

19. The device of claim 12, wherein the computer readable instructions further cause the processing unit to:
extend the dead reckoning fidelity interval using a beacon signal.

20. A method implemented by one or more processing units of a device, the method comprising:
identifying that the device is at an anchor location, the anchor location comprising a proximity zone along an edge of a dead zone;
in response to the device being at the anchor location, starting recording crowd sourcing data comprising one or more signals received while the device is at multiple positions, the multiple positions being determined based at least in part on dead reckoning;
determining a subsequent position of the device based on the dead reckoning that does not have acceptable estimated accuracy;
continuing to record the one or more signals at the subsequent position and further positions determined by the dead reckoning;
when an updated position of the device that does have acceptable estimated accuracy is determined, backtracking from the updated position, the backtracking including modifying one or more of the subsequent position and the further positions of the device to have acceptable estimated accuracy; and
sending, to a data service, a portion of the crowd sourcing data that is associated with the one or more of the subsequent position and the further positions of the device that have been modified to have acceptable estimated accuracy.

21. A device comprising:
a processor and storage; and
a position determination module configured to determine multiple positions of the device based on dead reckoning and determine estimated accuracy of the multiple positions of the device, the multiple positions comprising an anchor location, an intermediate position that does not have acceptable estimated accuracy, and a later position that does have acceptable estimated accuracy;
a backtracking module configured to modify the intermediate position to have acceptable estimated accuracy based on backtracking from the later position, producing an updated position;
a data collection module configured to record crowd sourcing data comprising one or more signals received while the device is at the multiple positions; and
a communication module configured to send a portion of the crowd sourcing data to a data service, the portion being associated with the updated position of the device that has acceptable estimated accuracy,
wherein the position determination module, the backtracking module, the data collection module, and the communication module are stored on the storage and executable by the processor.

22. The device of claim 21, wherein the position determination module is further configured to determine that the device is at the anchor location, the anchor location comprising a proximity zone along an edge of a dead zone.

23. The device of claim 21, wherein the data collection module is further configured to start recording the crowd sourcing data based on the device being at the anchor location.

24. The device of claim 21, wherein the communication module is further configured to defer sending the portion of the crowd sourcing data until the intermediate position is modified to produce the updated position that does have acceptable estimated accuracy.

* * * * *